United States Patent
Knowles

(10) Patent No.: US 11,625,356 B2
(45) Date of Patent: Apr. 11, 2023

(54) NETWORK COMPUTER WITH TWO EMBEDDED RINGS

(71) Applicant: Graphcore Limited, Bristol (GB)

(72) Inventor: Simon Knowles, Bristol (GB)

(73) Assignee: GRAPHCORE LIMITED, Bristol (GB)

( * ) Notice: Subject to any disclaimer, the term of this patent is extended or adjusted under 35 U.S.C. 154(b) by 26 days.

(21) Appl. No.: 17/211,232

(22) Filed: Mar. 24, 2021

(65) Prior Publication Data
US 2021/0303505 A1    Sep. 30, 2021

(30) Foreign Application Priority Data

Mar. 26, 2020 (GB) ..................................... 2004430
Apr. 30, 2020 (GB) ..................................... 2006402

(51) Int. Cl.
| | | |
|---|---|---|
| G06F 15/17 | (2006.01) | |
| G06F 15/173 | (2006.01) | |
| G06F 15/80 | (2006.01) | |
| G06F 13/40 | (2006.01) | |

(52) U.S. Cl.
CPC ........ *G06F 15/173* (2013.01); *G06F 13/4068* (2013.01); *G06F 15/17375* (2013.01); *G06F 15/80* (2013.01)

(58) Field of Classification Search
None
See application file for complete search history.

(56) References Cited

U.S. PATENT DOCUMENTS

| | | | | |
|---|---|---|---|---|
| 7,613,900 | B2 * | 11/2009 | Gonzalez | G06F 15/17337 710/11 |
| 9,077,616 | B2 * | 7/2015 | Chen | H04L 41/12 |
| 9,742,630 | B2 * | 8/2017 | Philip | H04L 45/06 |
| 2009/0307467 | A1 | 12/2009 | Faraj | |
| 2010/0158005 | A1 * | 6/2010 | Mukhopadhyay | H04L 49/109 370/392 |
| 2010/0246581 | A1 * | 9/2010 | Henry | H04L 45/40 370/392 |

(Continued)

OTHER PUBLICATIONS

Jain, A., et. al., Comparative Design and Analysis of Mesh Torus and Ring NoC, 2015, Elsevier B V., pp. 330-337. (Year: 2015).*

(Continued)

*Primary Examiner* — Eric Coleman
(74) *Attorney, Agent, or Firm* — Haynes and Boone, LLP

(57) ABSTRACT

A computer comprising a plurality of interconnected processing nodes arranged in a configuration in which multiple layers of interconnected nodes are arranged along an axis, each layer comprising at least four processing nodes connected in a non-axial ring by at least respective intralayer link between each pair of neighbouring processing nodes, wherein each of the at least four processing nodes in each layer is connected to a respective corresponding node in one or more adjacent layer by a respective interlayer link, the computer being programmed to provide in the configuration two embedded one dimensional paths and to transmit data around each of the two embedded one dimensional paths, each embedded one dimensional path using all processing nodes of the computer in such a manner that the two embedded one dimensional paths operate simultaneously without sharing links.

25 Claims, 12 Drawing Sheets

(56) References Cited

U.S. PATENT DOCUMENTS

| | | | |
|---|---|---|---|
| 2013/0151713 A1 | 6/2013 | Faraj | |
| 2014/0143520 A1* | 5/2014 | Dobbs | G06F 9/546 |
| | | | 712/30 |
| 2014/0149715 A1* | 5/2014 | Inman | H04L 49/1507 |
| | | | 712/29 |
| 2014/0226479 A1* | 8/2014 | Fricker | H04L 47/24 |
| | | | 370/235 |
| 2018/0240039 A1 | 8/2018 | McLaren | |
| 2018/0287964 A1* | 10/2018 | Gray | H04L 12/18 |
| 2019/0045003 A1 | 2/2019 | Archer | |
| 2020/0065659 A1* | 2/2020 | Lee | G06N 3/063 |
| 2020/0089612 A1* | 3/2020 | Rustad | G06F 13/4022 |

OTHER PUBLICATIONS

Sequin, Carlo H., Doubly Twisted Torus Networks For VLSI Processor Arrays, 1981, IEEE, pp. 471-480. (Year: 1981).*

Arabnia, Hamid R. et al., Parallel Stereocorrelation on a Reconfigurable Multi-Ring Network,1996, Kluwer Academic Publishers, pp. 243-269. (Year: 1996).*

Maresca, M. et. al., Parallel Computer Vision on Polymorphic Torus Architecture, 1989, Springer-Verlag, Machine Vision and Applications pp. 215-230. (Year: 1989).*

Camara, Jose M., et al., Twisted Torus Topologies for Enhanced Interconnection Networks, 2010, IEEE, IEEE transactions on Parallel and Distributed Systems,vol. 21, No. 12, pp. 1765-1778. (Year: 2010).*

Wani, M.A., et al., Parallel Edge-Region Based Segmentation Algorithm Targeted at Reconfigurable Multi Ring Network, 2003, Kluwer Academic Publishers, Journal of Supercomputing 25, pp. 43-62. (Year: 2003).*

International Search Report and Written Opinion dated Jun. 9, 2021 for Application No. PCT/EP2021/057563. 17 pages.

Christoph Lenzen, et al., "CLEX: Yet Another Supercomputer Architecture?", Arxiv.org, Cornell University Library, Ithaca, NY. Jul. 1, 2016. XP080711482.

International Search Report and Written Opinion dated Jun. 8, 2021 for Application No. PCT/EP2021/057558. 16 pages.

International Search Report and Written Opinion dated Jun. 8, 2021 for Patent Application No. PCT/EP2021/057558. 16 pages.

* cited by examiner

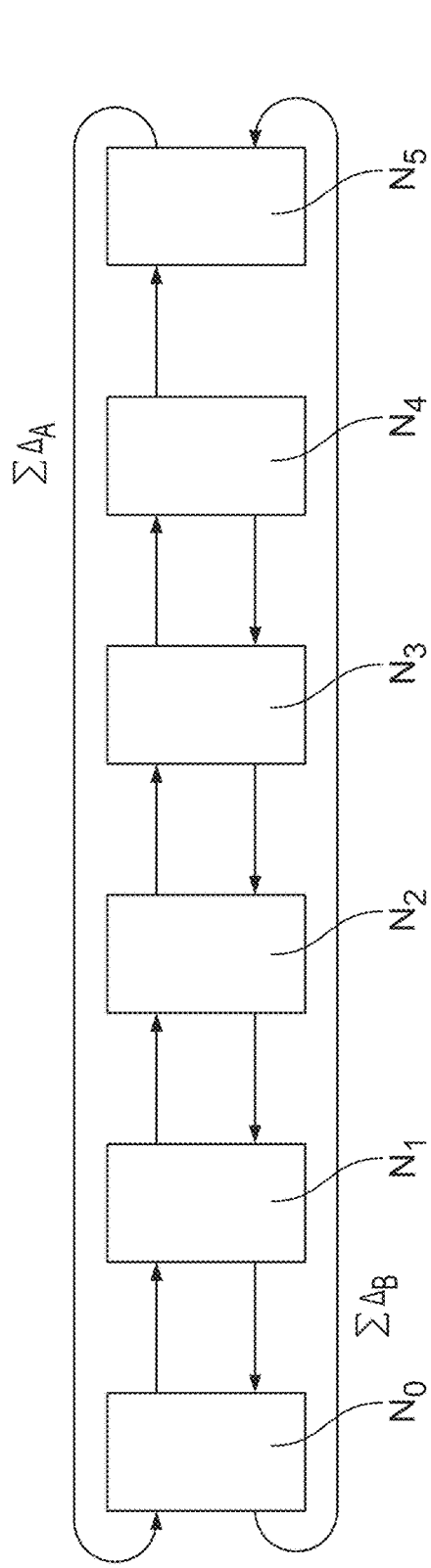
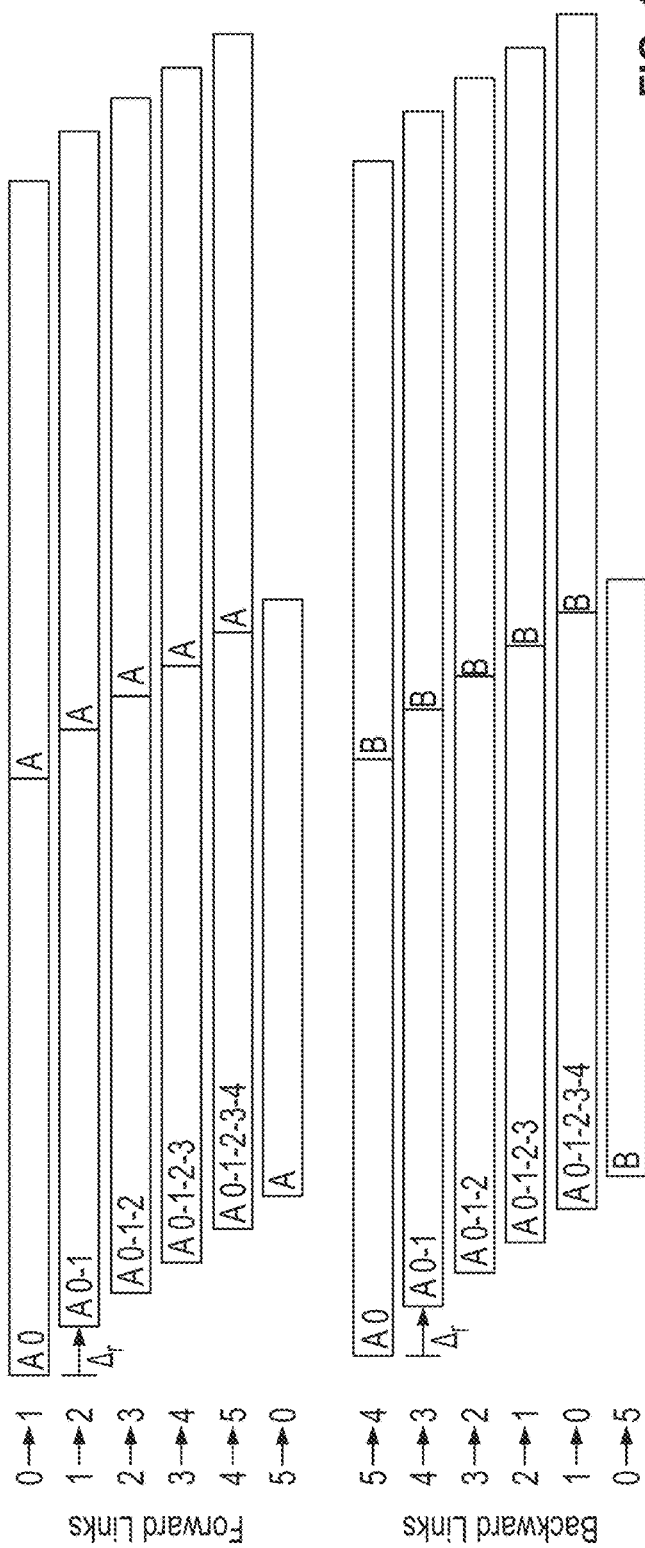
FIG. 1C
FIG. 1D

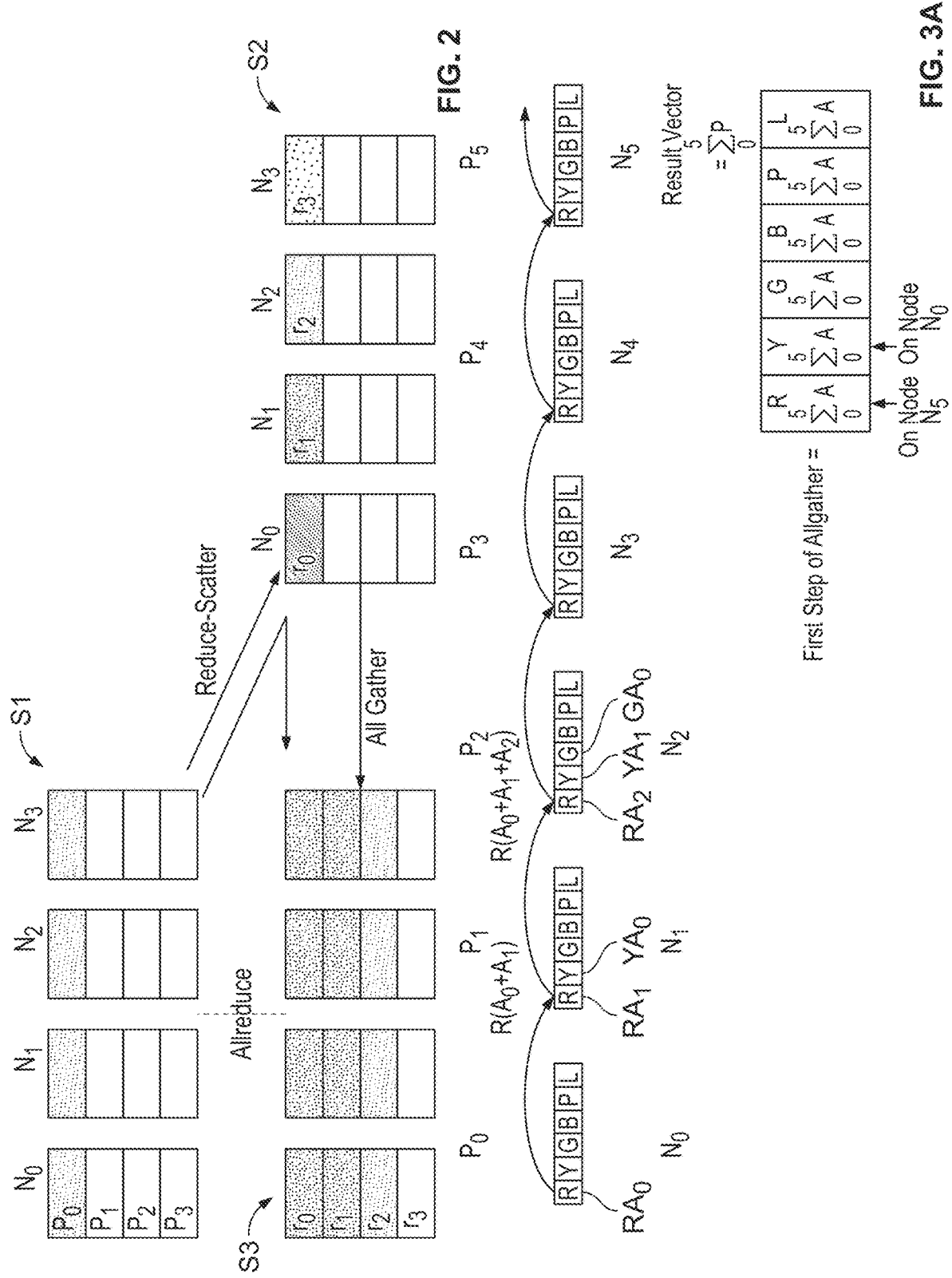

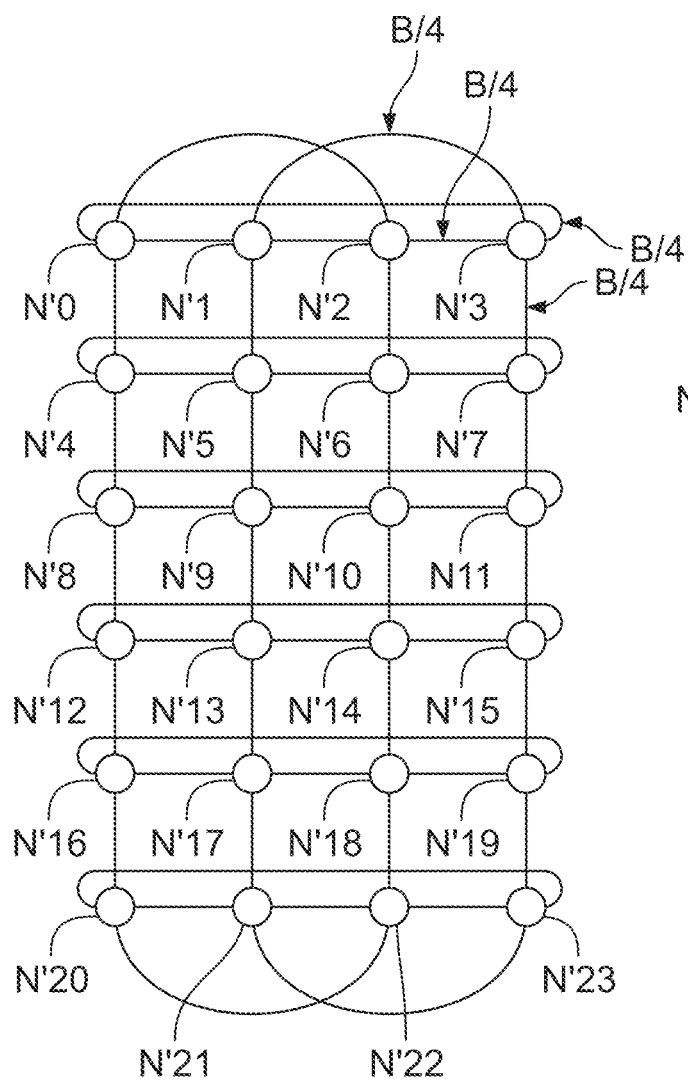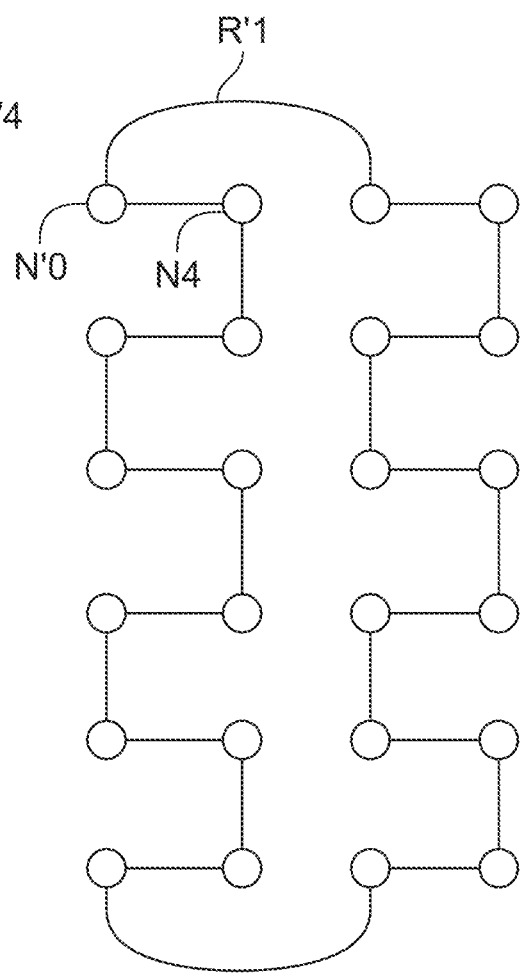
FIG. 8A
FIG. 8B

NETWORK COMPUTER WITH TWO EMBEDDED RINGS

CROSS-REFERENCE TO RELATED APPLICATIONS

The present application claims priority to United Kingdom Patent Application No. 2006402.8, filed on Apr. 30, 2020, and United Kingdom Patent Application No. 2004430.1, filed on Mar. 26, 2020, which are hereby incorporated herein by reference in their entireties.

FIELD

The present disclosure relates to the exchange of data between processing nodes connected in a computer particularly but not exclusively for optimising data exchange and machine learning/artificial intelligence applications.

BACKGROUND

Collectives are routines which are commonly used when processing data in a computer. They are routines which enable data to be shared and processed across multiple different processes, which may be running on the same processing node or different processing nodes. For example, if one process reads data from a data store, it can use a "broadcast" process to share that data with other processes. Another example is when the result of a particular function is needed on multiple processes. A "reduction" is a result which has required the application of a compute function to a data value from each of multiple processes. "Gather" and "scatter" collectives handle more than one data item. Certain collectives have become increasingly important in processing machine learning applications.

MPI (Message Passing Interface) is a message passing standard which can be applied to many parallel computing architectures. MPI defines a number of collectives applicable to machine learning. Two such collectives are termed "Reduce" and "Allreduce". A reduce operation enables a result of a compute function acting on multiple data values from different source processes to be provided at a single receiving process. Note that a receiving process may be one of the source processes. The Allreduce collective reduces the data values from multiple source processes and distributes a result to all the source processes (which are acting as receiving processes for the reduce result). For either Reduce or Allreduce operations, the reduction function can be any desired combining function, such as summation, taking the maximum or minimum etc. According to the MPI standard, the Allreduce collective may be implemented by reducing the data values from all source processes in a reduce collective (e.g. at one of the processes) and then broadcasting the result to each source process.

FIG. 1 is a schematic block diagram of a distributed architecture for training a neural network. A source of training data 100 is provided. This may be a database or any other kind of data store capable of holding training data applicable to the neural network model being trained. Processing according to the neural network model is itself distributed across multiple processing units 110a, 110b, 110c etc. Only three units are shown in FIG. 1 but it will readily be appreciated that any number of processing units could be utilised. Each processing unit 110a, 110b, 110c receives batches of training data from the training data source 100. Each processing unit 100a, 100b, 100c holds a set of parameters 112a, 112b, 112c which define the model. An incoming batch of training data is processed with the current set of parameters in a calculation function 114 and the results of the calculation function are used to generate so-called deltas which represent the difference between the original parameter and the new parameter as a result of applying the calculation function on the batch of training data and the current set of parameters. In many neural networks, these parameters are termed "weights" and so the delta values are termed "delta weights". The weights are labelled 112a, 112b, 112c and the delta weights are labelled 116a, 116b, 116c in FIG. 1. It will be appreciated that in practice, the weights and delta weights are stored in suitable stores accessible by the processing unit. If the weights and delta weights can be held in local memory, this renders the training process more efficient.

The aim of the architecture of FIG. 1 is not to train three separate models but to train a single model in a distributed manner. Therefore, the purpose is to have the model parameters (or weights) converge to a single common set in each processing unit. It is evident that starting from any particular set of weights, and assuming that the batch of training data received at each processing unit is not identical, then there would be variation in the delta weights which are produced by each calculation function in each processing unit. What is needed therefore is a way to combine and distribute the delta weights across the processing units after each iteration of batched training data. This is shown diagrammatically in FIG. 1 where a combinatorial function 118 received the delta weights from each processing unit and performs a mathematical function which reduces the delta weights, such as an averaging function. The output of the combinatorial function 118 is then fed back to combining circuitry 120a, 120b and 120c within each processing unit respectively. A new set of weights is thus produced as a combination of the original weights and the combined output from the combinatorial function 118 and the new weights 118a, 118b, 118c are stored back into local memory. Then, the next batch of training data is supplied to each processing unit and the process repeats multiple times. It is evident that if the starting weights of the processing units are the same, then after each iteration, they will be reset again to the same, new values. It can readily be seen that the above is an example of where the Allreduce function is particularly useful. The delta weights are supplied to the combinatorial function 118a where they are reduced and they are then supplied back to each of the processing units in their reduced form, where they can be combined with the original weights.

FIG. 1A is a schematic diagram to illustrate how an Allreduce collective might be implemented in a line connected topology of six processing nodes $N_0 \ldots N_5$. These processing nodes may correspond to the processing units of FIG. 1 in which the combinatorial function is distributed between the nodes so there is no longer a common combining node as in FIG. 1. The processing nodes are shown connected in a line configuration where each processing node is connected to its neighbour by a "forwards" link $L_F$ and a "backwards" link $L_B$. As shown in the diagram, and as the directional phrases imply, the forward links connect processing nodes from the left to right in FIG. 1A, and the backwards links connect processing nodes from the right to left in FIG. 1A. Each processing node has a processing capability designated 200 and a storage capability designated 202. The processing capability and storage capability can be implemented in any of a very large number of ways. In one particular manifestation, the processing node may comprise multiple tiles, each individual tile having its own processing capability and associated memory capability.

Each processing node also has one or more link interfaces which enables it to be connected to its neighbours via the links $L_F/L_B$.

To understand the implementation of the Allreduce collective, assume that the first node $N_0$ has generated a "partial" vector labelled $\Delta_0$. The "partial" may be a data structure comprising an array, such as a vector or tensor of delta weights. A partial vector is an array of partials, each corresponding to a computation on the processing node. Each "partial" may be a set of delta weights. This is stored in the storage capability 202 ready to be exchanged in an Allreduce collective. In a simple "streaming" line Allreduce algorithm, the forward links are used for "reduce" and the backward links are used for "broadcast". The algorithm starts with the processing node $N_0$ at one end (the left-hand node in FIG. 1A) sending its partial $\Delta_0$ to its adjacent node $N_1$. At this node, the incoming partial ($\Delta_0$ in this case) is reduced with the corresponding partial which was generated by the computing capability 200 at the processing node $N_1$, $\Delta_1$. The result of this reduction (shown as an add function in FIG. 1A) is then sent from processing node $N_1$ to the next connected node $N_2$. As mentioned further herein, the add function could be replaced by any combinatorial function which could be used to reduce the partials. The process occurs at each processing node, until at the final processing node, denoted $N_5$ in FIG. 1A, the reduction of the partials is complete. At this point, the reduction (summation A) is sent back to each processing node via the backward links $L_B$. It is received at each node, stored at that node in the memory capability, and then also transmitted to the next node. In this way, each processing node ends up with the reduced result.

FIG. 1B shows a timing diagram of the reduce and broadcast phases Note that a processing node cannot send a reduced result to the next node until it has received the incoming data from the previous node. Thus, there is an inherent latency marked AK for each outgoing transmission on the forward links.

Furthermore, the backward links are not utilised for broadcast until the fully reduced result has been obtained at the end node. However, if the partial vectors are large, due to the pipelined effect the lead data item of the result, being the reduction of the first partials from the partial vectors at each node, will return to the starting node well before that node has finished sending the data items of its partial, so there may be a substantial overlap of activity on all forward and backward links.

In a modification to this algorithm, which represents a small improvement, processing nodes at each end of the line can start to transmit their partials towards the central node, with the reduction being completed at the central nodes. In that case, the result is broadcast back to the end nodes. Note that in this scenario there would be a reversal in the direction of movement, for example at node $N_2$ on both the forward and backward links. If a line is closed into a ring (by connecting the final node $N_5$ to the first node $N_0$ on both the backward and forward links), a pipeline algorithm can serialise reduction and broadcast in the same direction, so that the two logical rings formed by the bi-directional links can each operate independently on half of the data. That is, each partial vector is split into two and the first half AA is reduced on the forward links (as in FIG. 1A), and broadcast on the connecting leg between $N_5$ and $N_0$. The other half of the vector AB is reduced on the backward links, and then broadcast on the connecting ring of the backward links, such that each node receives a copy of the Allreduce result.

FIG. 1D illustrates a corresponding timing diagram for the forward and backward links.

The principles of the one-dimensional ring shown in FIGS. 1C and 1D can be extended to rings in two dimensions such as in a torus or toroid connected computer.

Using rings in two dimensions, an alternative approach is to implement Allreduce using a reduce-scatter collective followed by an Allgather collective. A paper authored by Nikhil Jain and Yogish Sabharwal entitled "Optimal Bucket Algorithms for Large MPI Collectives on Torus Interconnects" (ICS' June 2-4, Tsukuba) presents bucket-based algorithms for Allgather, reduce-scatter and Allreduce collective assuming bi-directional links between processing nodes in a torus interconnected processor. This approach operates on the basis that there are multiple data values (fragments) to be handled in each step. These fragments may be partials in a partial vector as discussed earlier. In the reduce-scatter collective, each process starts with an initial partial vector. It is assumed that a reference here to a process is to a process carried out on a processing node. A partial vector can be divided into multiple elements or fragments. The corresponding elements of all processes are reduced, and these reduced elements are then distributed across the processes. In the Allgather collective, every process receives all elements from all other processes. The reduce-scatter collective reduces all partials and stores each reduction on a respective node—see FIG. 2. The Allreduce collective operation can be implemented by performing a reduce-scatter collective followed by an Allgather collective operation.

As discussed in Jain's paper, torus interconnects are attractive interconnection architectures for distributed memory supercomputers. In the above discussion, collectives have been explained in the context of communication between processes. In a distributed supercomputer, processing nodes are interconnected, and each processing node may be responsible for one or more process in the context of collectives. A torus interconnect is a type of mesh interconnect with processing nodes arranged in an array of n-dimensions, with each node connected to its nearest neighbours, and corresponding nodes on opposite edges of the array also connected. Bi-directional communication links may exist between interconnected processing nodes.

The algorithms for implementing collectives which are discussed in the above-referenced paper authored by Jain and Sabharwal are applied on torus connected architectures. This allows the collectives to process different fragments of the vectors in rings in different dimensions at the same time, making the process bandwidth efficient. However, the present inventor has determined that the techniques presented by Jain and Sabharwal are not optimal for symmetric or asymmetric toroids, despite the accepted view in the field that this is the case. A symmetric toroid is understood to be one in which the number of nodes in a non-axial ring matches the number of nodes in axial rings of the toroid. An asymmetric toroid is understood to be one in which the number of nodes in the non-axial rings does not match the number of nodes in the axial rings. Note that in both cases the number of axial rings equals the number of nodes in a non-axial ring.

An objective of the present disclosure is to present an improved topology and method for implementing a collective, such as an Allreduce function, particularly but not exclusively for use in processing functions in machine learning.

SUMMARY

Although embodiments of the disclosure are described in the context of a collective, such an Allreduce function, it will be appreciated that the improved topologies and methods described herein have broader application.

According to one aspect of the disclosure there is provided a computer comprising a plurality of interconnected processing nodes arranged in a configuration with multiple layers arranged along an axis, each layer comprising at least four processing nodes connected in ring by respective intralayer link between each pair of neighbouring processing nodes, wherein processing nodes in each layer are connected to respective corresponding nodes in one or more adjacent layer by respective interlayer link, the computer being programmed to transmit data around two embedded one dimensional paths, each logical path using all processing nodes of the computer in such a manner that the embedded one dimensional paths operate simultaneously without sharing links.

According to another aspect of the disclosure there is provided a computer comprising a plurality of interconnected processing nodes arranged in a configuration in which multiple layers of interconnected nodes are arranged along an axis, each layer comprising at least four processing nodes connected in a non-axial ring by at least respective intralayer link between each pair of neighbouring processing nodes, wherein each of the at least four processing nodes in each layer is connected to a respective corresponding nodes in one or more adjacent layer by a respective interlayer link, the computer being programmed to provide in the configuration two embedded one dimensional paths and to transmit data around each of the two embedded one dimensional paths, each embedded one dimensional path using all processing nodes of the computer in such a manner that the two embedded one dimensional paths operate simultaneously without sharing links.

Embodiments of the disclosure may provide one or more of the following, alone or in combination:

- a computer wherein the multiple layers comprise first and second endmost layers and at least one intermediate layer between the first and second endmost layers, wherein each processing node in the first endmost layer is connected to a corresponding one of the processing nodes in the second endmost layer;
- a computer of claim 1 wherein the configuration is a toroid configuration in which respective connected corresponding nodes of the multiple layers form at least four axial rings;
- a computer wherein the multiple layers comprise first and second endmost layers and at least one intermediate layer between the first and second endmost layers, wherein each processing node in the first endmost layer is connected to a non-neighbouring node in the first endmost layer in addition to its neighbouring node, and each processing node in the second endmost layer is connected to a non-neighbouring node in the second endmost layer in addition to its neighbouring node;
- a computer wherein each processing node is configured to output data on its respective intralayer and interlayer links with the same bandwidth utilisation on each of the intralayer and interlayer links of the processing node;
- a computer wherein each layer of the multiple layers has exactly four nodes;
- a computer which comprises a number of layers arranged along the axis which is greater than the number of processing nodes in each layer;
- a computer wherein the number of layers arranged along the axis is the same as the number of nodes in each layer;
- a computer wherein the intralayer and interlayer links comprise fixed connections between the processing nodes;
- a computer wherein at least one of the interlayer and intralayer links comprise switching circuitry operable to connect one of the processing nodes selectively to one of multiple other processing nodes;
- a computer wherein at least one of the interlayer and intralayer links of processing nodes in the first endmost layer comprise switching circuitry operable to disconnect the processing node from its corresponding node in the second endmost layer and connect it to a non-neighbouring node in the first endmost layer;
- a computer wherein at least one of the interlayer links of processing nodes in the first endmost layer comprise switching circuitry operable to disconnect the processing node from its neighbouring node in the first endmost layer and connect it to a corresponding node in the second endmost layer;
- a computer wherein each embedded one-dimensional path comprises alternating sequences of one of the interlayer links and one of the intralayer links;
- a computer which is programmed to transmit data in a direction of transmission in each layer which is the same in all layers within each one-dimensional path;
- a computer of any preceding claim in which each one-dimensional embedded path comprises a sequence of processing nodes which are visited in each layer which is the same in all layers within each one-dimensional path.
- a computer which is programmed to transmit data in a direction of transmission in each layer which is different in successive layers of transmission around each one-dimensional path;
- a computer of any of claims 1 to 12 in which each one-dimensional embedded path comprises a sequence of processing nodes which are visited in a direction in each layer which is different in successive layers each one-dimensional path.
- a computer comprising six layers, each having four processing nodes connected in a ring;
- a computer which comprises eight layers, each having eight processing nodes connected in a ring;
- a computer which comprises eight layers each having four processing nodes connected in a ring;
- a computer which comprises four layers, each having four processing nodes connected in a ring,
- a computer in which the ring of each layer in which the processing nodes are connected is non-axial;
- a computer wherein each processing node is programmed to divide a respective partial vector of that processing node into fragments and to transmit the data in the form of successive fragments around each one-dimensional path;
- a computer which is programmed to operate each path as a set of logical rings, wherein the successive fragments are transmitted around each logical ring in simultaneous transmission steps;
- a computer programmed to transmit data in data transmission steps wherein each link of a processing node is utilised with the same bandwidth as other links of that processing node in each data transmission step, that is there is symmetric bandwidth utilisation;
- a computer wherein each processing node is configured to output a respective fragment on each of two links simultaneously, wherein the fragment output on each of the links has the same size or approximately the same size;

a computer wherein each processing node is configured to reduce multiple incoming fragments with multiple respective corresponding locally stored fragments; and/or a computer wherein each processing node is configured to transmit fully reduced fragments on each of its intralayer and interlayer links simultaneously in an Allgather phase of an Allreduce collective.

Another aspect of the disclosure provides a method of generating a set of programs to be executed in parallel on a computer comprising a plurality of processing nodes connected in the configuration with multiple layers arranged along an axis, each layer comprising at least four processing nodes connected in a non-axial ring by a respective intralayer link between each pair of neighbouring processing nodes, wherein processing nodes in each layer are connected to respective corresponding nodes in each adjacent layer by an interlayer link, the method comprising:

generating at least one data transmission instruction for each program to define a data transmission stage in which data is transmitted from the processing node executing that program, wherein the data transmission instruction comprises a link identifier which defines an outgoing link on which data is to be transmitted from that processing node in that data transmission stage; and determining the link identifiers in order to transmit data around each of two embedded one-dimensional paths provided by the configuration, each path using all processing nodes of the computer in such a manner that the embedded one-dimensional logical paths operate simultaneously without sharing links.

In some embodiments of the method, each program comprises one or more instruction to deactivate any of its interlayer and intralayer links which are not used in the data transmission step.

In some embodiments of the method each program comprises one or more instruction to divide a respective partial vector of the processing node on which that program is executed into fragments and transmit the data in the form of successive fragments over the respectively defined link.

In some embodiments of each link of a processing node is utilised with the same bandwidth as other links of that processing node in each data transmission step, that is the configuration operates with symmetric bandwidth utilisation.

A further aspect of the disclosure provides a method of executing a set of programs in parallel on a computer comprising a plurality of processing nodes connected in a configuration with multiple layers arranged along an axis, each layer comprising at least four processing nodes connected in a ring by a respective intralayer link between each pair of neighbouring processing nodes, wherein processing nodes in each layer are connected to a respective corresponding nodes in each adjacent layer by an interlayer link, the method comprising:

executing at least one data transmission instruction in each program to define a data transmission stage in which data is transmitted from the processing node executing that program, wherein the data transmission instruction comprises a link identifier which defines an outgoing link on which data is to be transmitted in that data transmission stage;

the link identifiers having been determined in order to transmit data around each of two embedded one-dimensional paths, each logical ring using all processing nodes of the computer in such a manner that the embedded one dimensional path operates simultaneously without sharing links.

BRIEF DESCRIPTION OF THE DRAWINGS

For a better understanding of the present disclosure and to show how the same may be carried into effect, reference will now be made by way of example to the accompanying drawings.

FIG. 1C is a schematic diagram of a line with the end nodes connected into a ring.

FIG. 1D is a timing diagram of a ring Allreduce algorithm,

FIG. 2 is a schematic diagram illustrating implementation of an Allreduce function by a reduce-scatter step followed by an Allgather step.

FIGS. 3A and 3B illustrate a bucket based Allreduce algorithm.

FIG. 8A illustrates a computer network in the form of a 4×6 diagonal closed prism.

FIGS. 8B and 8C illustrate two isomorphic rings embedded on the network of FIG. 8A.

Figure 1:
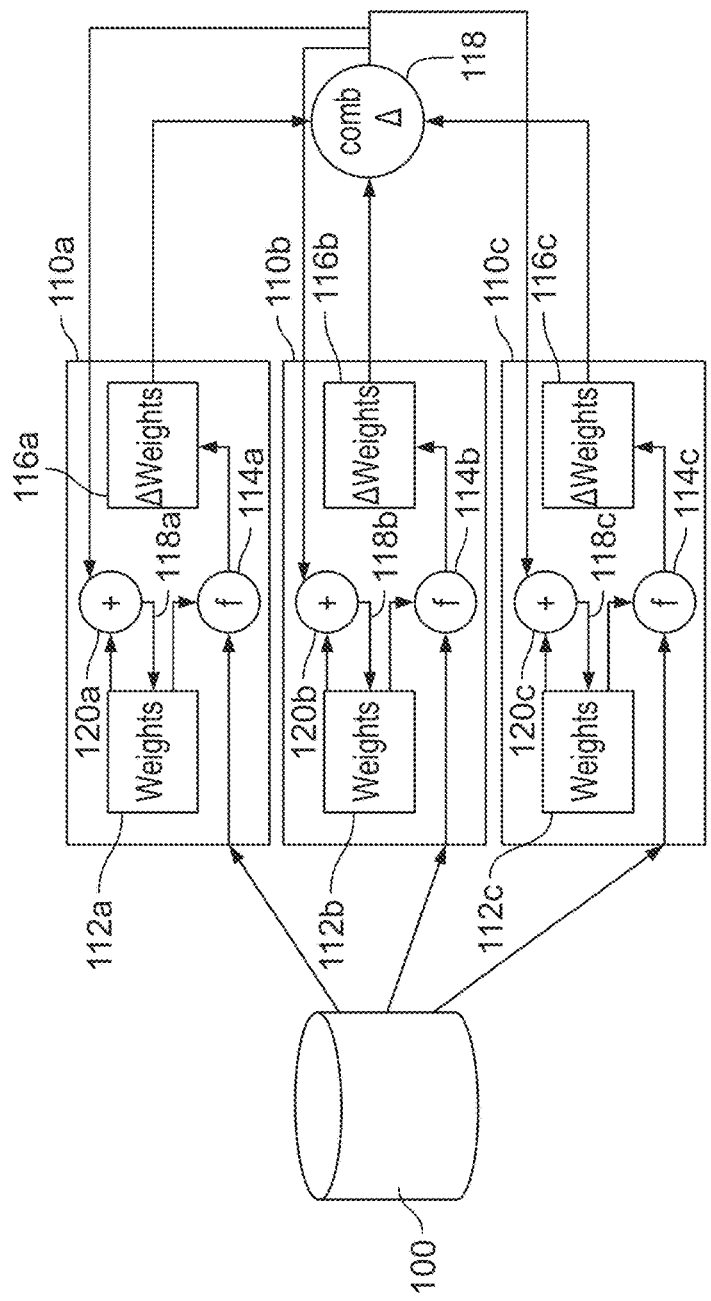
FIG. 1 is a schematic diagram illustrating distributed training in a neural net.

Aspects of the present disclosure have been developed in the context of a multi-tile processor which is designed to act as an accelerator for machine learning workloads. The accelerator comprises a plurality of interconnected processing nodes. Each processing node may be a single multi-tile chip, a package of multiple chips or a rack of multiple packages. The aim herein is to devise a machine which is highly efficient at deterministic (repeatable) computation. Processing nodes are interconnected in a manner which enable collectives, especially but not exclusively Broadcast and Allreduce to be efficiently implemented. It is noted, however, that embodiments of the disclosure describe herein may have other applications.

One particular application is to update models when training a neural network using distributed processing. In this context, distributed processing utilises multiple processing nodes which are in different physical entities, such as chips or packages or racks. That is the transmission of data between the processing nodes requires messages to be exchanged over physical links.

The challenges in developing a topology dedicated to machine learning differ from those in the general field of high performance computing (HPC) networks. HPC networks usually emphasise on demand asynchronous all-to-all personalised communication, so dynamic routing and bandwidth over provisioning are normal. Excess bandwidth may be provisioned in a HPC network with the aim of reducing latency rather than to provide bandwidth. Over provisioning of active communication links waste power which could contribute to compute performance. The most common type of link used in computing today draws power when it is active, whether or not it is being used to transmit data.

The present inventor has developed a machine topology which is particularly adapted to ML workloads and addresses the following attributes of ML workloads. The present embodiments provide different structures in which two rings are embedded on an m×n computer network, where m is the number of nodes in each of multiple layers of the network, n is the number of layers, and each ring visits all nodes in the network.

In ML workloads, inter chip communication is currently dominated by broadcast and Allreduce collectives. The broadcast collective can be implemented by a scatter collective followed by an Allgather collective, and the Allreduce collective can be implemented by a reduce-scatter collective followed by an Allgather collective. In this context, the term inter-chip denotes any communication between processing nodes which are connected via external communication links. As mentioned, these processing nodes may be chips, packages or racks.

Note that the communication links could be between chips on a printed circuit board, or between chips on different printed circuit boards.

It is possible to compile the workloads such that within an individual intelligence processing unit (IPU) machine, all-to-all communication is primarily inter-chip.

The Allreduce collective has been described above and is illustrated in FIG. 2. FIG. 2 shows a set of partial values or "partial" vector $P_0$, $P_1$, $P_2$, $P_3$ on each of four nodes in a starting state $S_1$. In this context a node is a processing node in a network of processing nodes.

Note that each node $N_0$, $N_1$, $N_2$, $N_3$ has four "corresponding" partials which are marked accordingly (large diamond grid, wide downward diagonal stripe, large square grid, wide upward diagonal stripe). That is, each partial has a position in its partial vector such that P0(n) has the same position in its vector on node n as P0 (n+1) in its vector on node n+1. The suffix (n) is used to denote the node in which the partial resides—thus $P_0(0)$ is the partial $P_0$ on node $N_0$. In a reduce-scatter pass, corresponding partials are reduced and the reduction provided to one of the nodes. For example, partials P0(0), P0(1), P0(2), P0(3) are reduced (to r0) and placed onto node $N_0$. Similarly, partials P1(0), P1(1), P1(2) and P1(3) are reduced (to r1) and placed onto node $N_1$. And so forth so that in an intermediate state 52, each node has one of the reductions r0, r1, r2 and r3. As explained, the reduction may be by any combinatorial function f (Pi0) which could include independent operators (e.g. max) or associative operators=P1 (0)*P1(1)*P1 (2)*P1(3).

Then, in an Allgather pass, each reduction is provided to all nodes to activate a state S3 wherein each node now holds all four reductions. Note that in S1, the "corresponding" partials, e.g. P0(0), P0(1), P0(2) and P0(3) may all differ whereas, in state S3, each reduction, e.g. r0, is the same at all nodes, where ri=f(Pi(0), Pi(1), Pi(2) and Pi(3)). In machine learning, the set of partials $P_0$, $P_1$, $P_2$, P3 is a vector. A vector of partials (e.g. updated weights) is produced on each pass of the model during training. The reduction r0, r1, r2, r3, shown by diamond grid, downward diagonal stripe, square grid, upward diagonal stripe on each node in state S3 is the full reduction vector that is the vector of "results" or fully reduced partials. In the context of machine learning, each partial could be an updating delta for a parameter in the model. Alternatively (in an arrangement not described further herein) it could be an updated parameter.

Figure 3B:
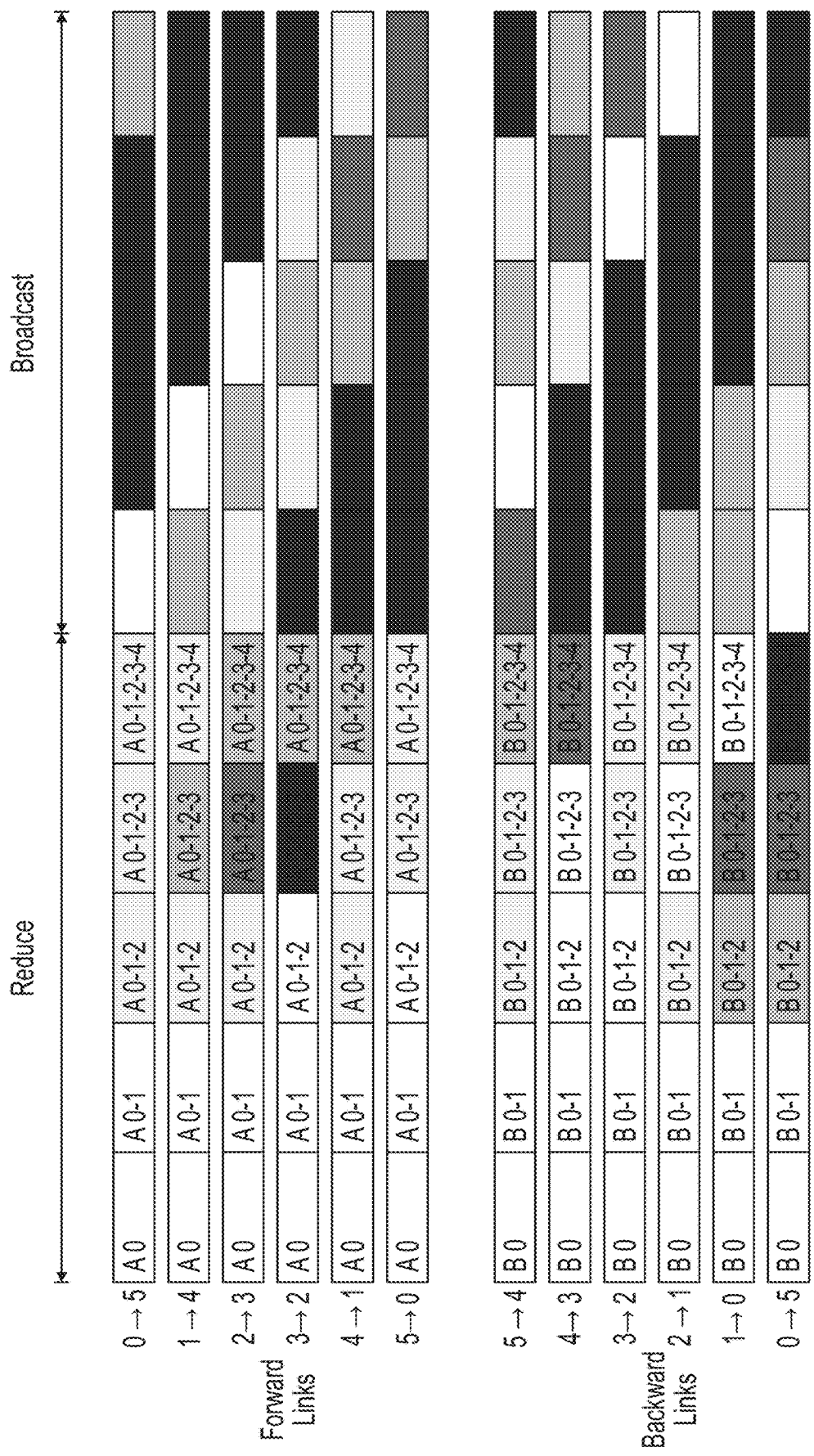

FIGS. 3A and 3B illustrate a bucket-based algorithm for reduce-scatter/Allgather that assumes six "virtual" rings. These are also termed "logical" rings herein. FIG. 3A is a schematic diagram illustrating the reduction of partials in multiple virtual rings. Each partial is split into six fragments. In FIG. 3A, the capital letters R, Y, G, B, P, L each denote a different fragment of a partial stored at each node, indicated by hatchings diamond grid, upward diagonal stripe, square grid, horizontal stripe, downward diagonal stripe, vertical stripe. The letters denote corresponding fragments which are to be reduced with each other and define the "virtual" or "logical" ring for those fragments. Looking at FIG. 3A, the "R" fragments in each of the partials P0, P1, P2, P3 and P4 are reduced into a single fragment in the result vector (RΣ). Similarly, for the Y, G, B, P and L fragments.

FIG. 3B shows a timing diagram with time on the horizontal axis indicating the data exchanges and computations in each step of the Allreduce process. In FIGS. 3A and B, the Allreduce process is accomplished by a reduce-scatter phase followed by an Allgather phase.

In FIG. 3B each of the fragments are denoted by different hatching as follows: R—diamond grid, Y—upward diagonal stripe, G—square grid, B—horizontal stripe, P—downward diagonal stripe, L—vertical stripe.

The notation in FIGS. 3A and 3B is as follows. The partials are each denoted P0, P1, P2, P3, P4, P5. At the start of the process, each partial is stored on a respective node N0, N1, N2, N3, N4, N5. Each fragment is labelled according to its fragment ordinant and its position in the virtual ring in which it is deemed to be reduced. For example, RA0 denotes the R fragment in partial P0, because this is the first fragment in a virtual ring formed by nodes N0-N1-N2-N3 N4-N0.

RA1 denotes the R fragment at node N1, which is in the second position in its virtual ring. YA0 denotes the Y fragment at node N1. The "0" suffix indicates it is the first fragment in its virtual ring, the Y-ring being N1-N2-N3-N4-N0-N1. Note in particular that the suffixes on A reflect the virtual rings, and do not correspond to the physical nodes (or the partials). Note that FIG. 3A shows only the virtual rings on the forward links. FIG. 3B shows that an equivalent process is occurring on the backward links, with the fragments denoted as B.

In step one, the first fragment (the A0) in each virtual ring is transferred from its node to the next adjacent node where it is reduced with the corresponding fragment at that node. That is, RA0 moves from N0 to N1 where it is reduced into R(A0+A1). Once again, the "+" sign is used here as a shorthand for any combinatorial function. Note that in the same step the A0 10 fragments of each virtual ring will simultaneously be being transmitted. That is, the link between $N_1$ and $N_2$ is used to transmit YA0, the link between N2 and N3 is used to transmit GA0 et cetera. In the next step, the corresponding reduced fragments are transmitted over the forward links to their next adjacent node. For example, R(A0+A1) is transmitted from N1 to N2, and Y(A0+A1) is transmitted from N2 to N3. Note that for reasons of clarity not all 15 fragments are numbered, nor are all transmissions numbered in FIG. 3A. The full set of fragments and numbers are shown in FIG. 3B. This process carries on for five steps. After five steps, there is a reduction of all fragments on each node. At the end of the fifth step, this reduction is on the last node of each corresponding ring for that fragment. For example, the R reduction is on node $N_5$.

The beginning of the Allgather phase starts by a transmission from the last to the first node in each virtual ring. Thus, the final reduction for the R fragments ends on node N5 ready for the first step of the Allgather phase. The final reduction of the Y fragments correspondingly ends up on the node N0. In the next step of the Allgather phase, the reduced fragments are transmitted again to their next adjacent node. Thus the fully reduced R fragment is now also at N2, the fully reduced Y fragment is now also at N3 and so on. In this way, each node ends up at the end of the Allgather phase with all fully reduced fragments R, Y, G, B, P, L of the partial vector.

Implementation of the algorithm is effective if the computation required for the reduction can be concealed behind the pipeline latency. The inventor has noted that in forming suitable rings in a computer for implementation of Allreduce, it is most efficient if a tour of the ring visits each node in the ring only once.

Figure 1A:
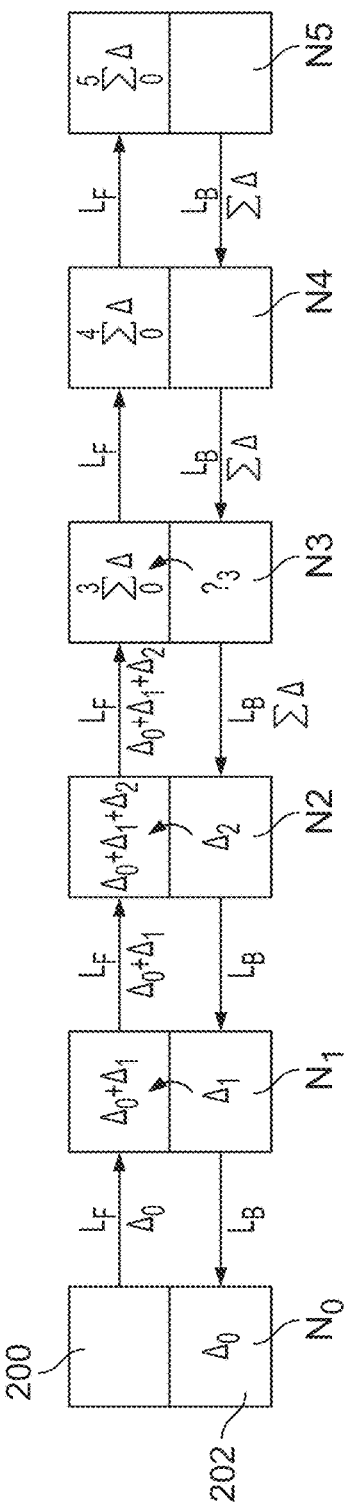
FIG. 1A is a schematic diagram showing a line of processing nodes for implementing a simple "streaming" line Allreduce algorithm.
Figure 1B:
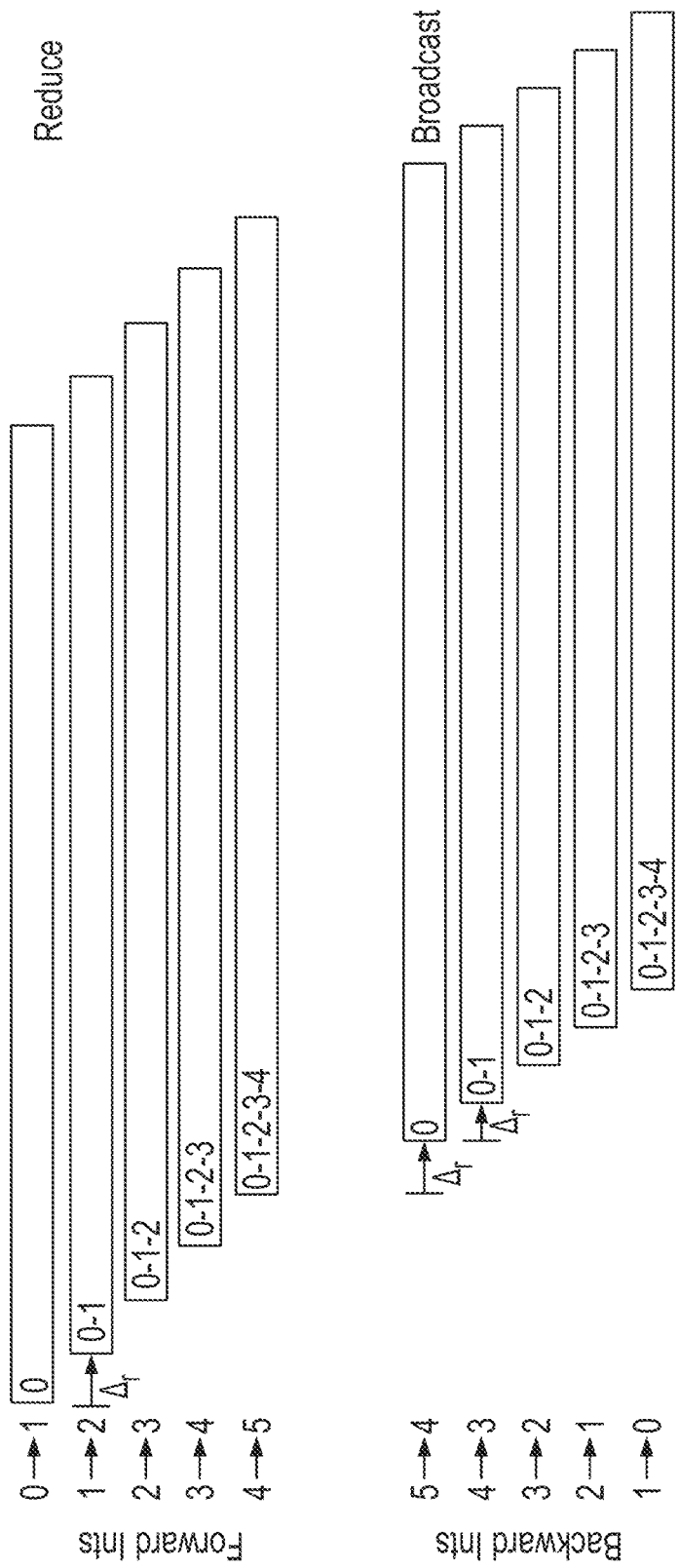
FIG. 1B is a timing diagram of a "streaming" line Allreduce algorithm.

Therefore the natural ring formed by a line with bi-directional links (FIG. 1A) is not the most efficient ring.

There will now be described an improved topology for an interconnected network of processing nodes which permits an efficient exchange of partials and results between processing nodes to implement an Allreduce collective.

Figure 4A:
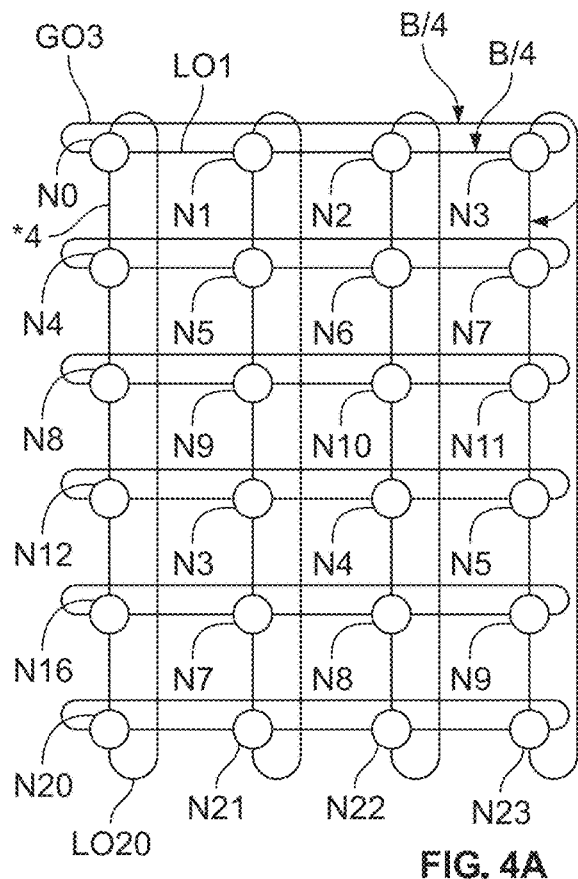
FIG. 4A illustrates a computer network in the form of a 4×6 toroid, in which two isomorphic rings are embedded.

FIG. 4A is a schematic diagram showing a connected topology of multiple processing nodes. In FIG. 4A there are twenty-four processing nodes connected in a toroid formation, but it will be appreciated that the principles could be extended to different numbers of nodes, some of which are exemplified in the following description. Furthermore, the principles described herein may be extended to a different topology of a diagonal closed square prism, as described later. Other configurations adopting these principles are envisaged. Each processing node is labelled with the number for ease of reference. In the following description, the prefix N will be inserted when referring to a node. For example, N0 represents the top left-hand processing node. The processing nodes are connected by links in the manner to be described. Each link may be bi-directional, that is it may transport data in both directions over the link. The links may operate such that this bi-directional functionality can take place simultaneously (that is, the link may be utilised in both directions at the same time). Note that there is a physical interconnectivity and a logical connectivity. The logical connectivity is used to form two embedded, continuous rings. Note that the embedded rings are also referred to as 'paths' herein. The terms are interchangeable, but recognise that the term 'virtual rings' is reserved for the scenarios outlined above where multiple fragments may be operating in virtual rings on each embedded ring or path. In some embodiments, each embedded ring (or path) can operate in two directions. Firstly, the physical connectivity will be described. The processing nodes are connected in a toroid configuration. Processing nodes along the y axis are each connected to their neighbouring node by a single bi-directional link. All links are not labelled in FIG. 4A for clarity reasons. However, the links from node N0 are shown. Link L04 joins the processing node N0 to the processing node N4 which is below it in the y axis. Note that the reference to "below" implies a particular orientation of the computer network. In practice, there is no implied orientation of the computer network, any orientation description is purely for the sake of explanation with reference to the Figures. The network is comprised of multiple layers organised along the y axis. In each layer, there are four processing nodes connected by respective bi-directional links in a ring. Each layer ring is considered to be non-axial, because it does not extend along the y axis. For example, the processing node N0 has a link L01 connecting it to its neighbouring node in its layer. The node N0 also has a link L03 connecting it to its other neighbouring node N3 in the layer. The toroid structure is completed by corresponding processing nodes in 'endmost' layers being connected by a bi-directional link. Note that the term 'endmost' is a convenient reference to the Figures. In fact, in a toroid, the corresponding connected nodes of adjacent layers form continuous axial rings. For example, the node N0 in the first endmost layer is connected to the node N20 in a second endmost layer by a link L020. Note that in the Figures the endmost layers are distinguished from intermediate layers (those formed by nodes N4 through N7, N8 through N11, N12 through N15 and N16 through N19 (by the fact that they are connected together at their corresponding processing nodes). In reality, they would be part of a continuous ring.

The links illustrated in FIG. 4A may be embodied in different manifestations. Some particular examples are discussed later. Note, in particular, however, that each link may be a single physical link structure and provide a bi-directional communication path over that physical link structure. Alternatively, each direction of a link structure may be a separate physical manifestation. Note too that the links may be fixed links. That is, where a link connects together two processing nodes it is fixed in place after the network has been built and configured. Alternatively, links may be attached to or comprise switching circuits which enable the connectivity of the network to be altered after it has been built.

Figure 4B:
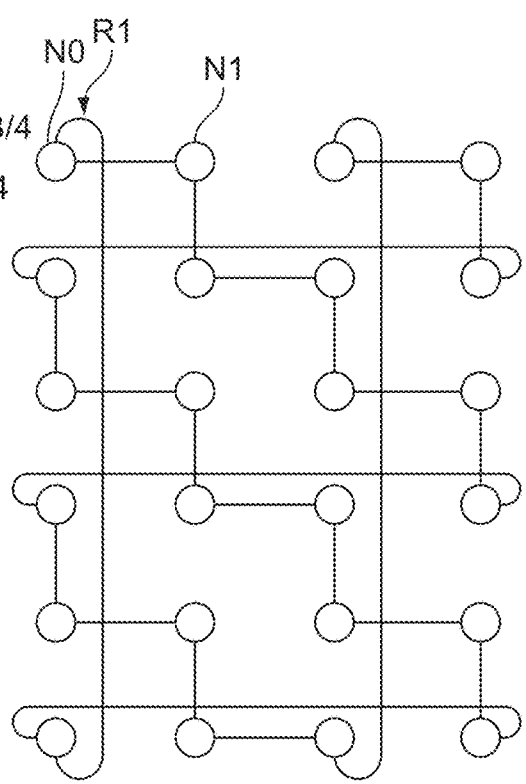
FIGS. 4B and 4C show each of the isomorphic embedded rings according to one embodiment.
Figure 4C:
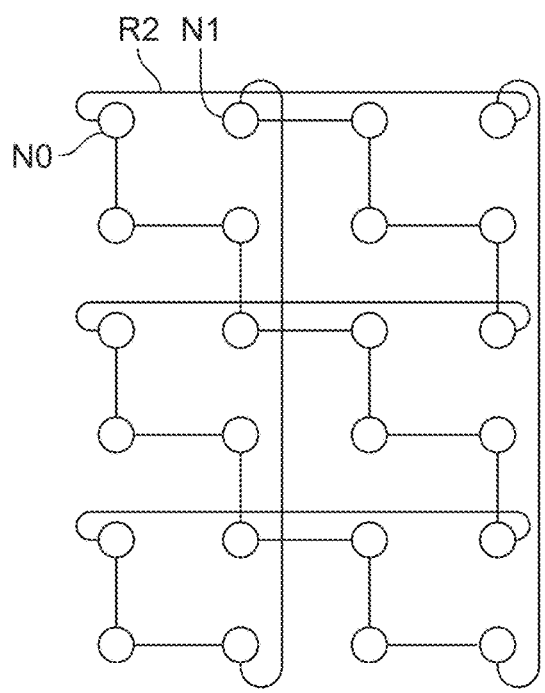

According to the novel principles described herein, the physical connectivity shown in FIG. 4A enables two logical embedded rings (each optionally bi-directional) to be embedded in the network. FIG. 4B shows a first such ring $R_1$. Not all nodes are shown with reference numerals in FIG. 4B for the sake of clarity, but it will be appreciated that they are the same nodes as those illustrated in FIG. 4A. The ring R1 in FIG. 4B extends through the nodes as follows in one continuous path along which data may be transmitted. The ring R1 extends through a sequence of nodes from node N0 to N1 to N5 to N6 to N10 to N11 to N15 to N12 to N16 to N17 to N21 to N22 to N2 to N3 to N7 to N4 to N8 to N9 to N13 to N14 to N18 to N19 to N23 to N20 and back to N0. The ring R2 extends from N0 to N3 to N23 to N22 to N18 to N17 to N13 to N12 to N8 to N11 to N7 to N6 to N2 to N1 to N21 to N20 to N16 to N19 to N15 to N14 to N10 to N9 to N5 to N4 and back to N0, visiting each node in turn.

Each ring comprises all twenty-four processing nodes. Note also that the two rings can be used simultaneously because there is no link which is used in the same ring. Thus, there is no conflict on any single path between processing nodes. This is stated herein as that there are no shared links between the rings. The rings are referred to as isomorphic rings because they each have the same length and pass through the same number of processing nodes.

Figure 4D:
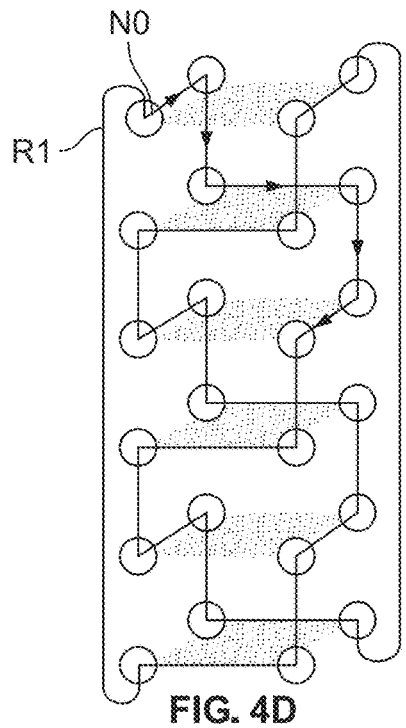
FIG. 4D is a three-dimensional diagram showing one of two embedded rings in the computer network of FIG. 4A.

FIG. 4D illustrates a three-dimensional schematic view showing the ring R1. Note that the other ring is the same rotated 90 degrees about the y axis. Consider the use of the structure shown in FIG. 4D when programs to implement the Allreduce ring algorithm described earlier. Each node outputs n−1/n(v) size of fragment, where n is the number of nodes, and v is the size of a data structure that is being reduce-scattered or Allgathered in a particular phase. At the beginning, v is the size of the partial vector. The number of fragments equals the number of nodes in the ring before each step around the ring. In most embodiments each fragment has the same size. However, there may be scenarios, for example where the number of elements in a vector are not evenly divisible, where fragments may slightly differ in size. In that case, they are approximately the same size—they may differ by one or two elements depending on the division factor. Note that in comparison with the structure described in the Jain paper referenced earlier, each ring passes through all nodes, and all links are used all of the time. Each processing node can output its data on four links simultaneously and can be configured to operate a full bandwidth utilisation. That is, if the node bandwidth is designated B, each link has a bandwidth utilisation of B/4. This is a symmetric bandwidth utilisation at each processing node. Consider data being transmitted from N0 to N1 along the link L01 in the first endmost layer of the network shown in FIG. 4D. The arrowhead denotes this direction of transmission of data. As already mentioned, it is possible that the ring is also transmitting data in the reverse direction. Considering, however, the forward going direction denoted by the arrows, the next step in the path is from node N1 to node N5. Thus, the path is uses an intralayer link from N0 to N1 and an interlayer link from N1 to N5. The next step in the path is an intralayer link (N5 to N6) followed by an interlayer link from N6 to N10. Thus, the path comprises successive sequences of an intralayer link and an interlayer link. In each layer, the nodes can be visited in one of two directions, clockwise and anticlockwise. In FIG. 4D, the arrowhead denotes that in the nodes are visited in the clockwise direction in the first endmost layer. Similarly, nodes are visited in a clockwise direction in the next intermediate layer, and in all subsequent layers.

Figure 4E:
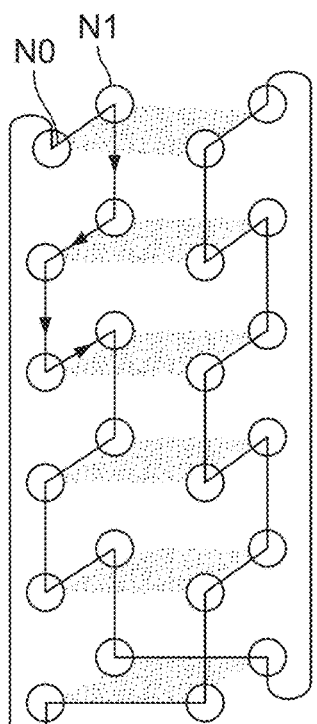
FIG. 4E is a 3D schematic diagram showing an alternative one of two embedded rings in the computer network of FIG. 4A.

Note, however, that this does not need to be the case. That is, the direction in which nodes are visited around a particular layer may be the same in each layer, or different in each layer. In some embodiments, it is the same in each layer, and in other embodiment it is different in different layers, for example in successive layers. Note that data may be transmitted in either direction around each path, if the links are simultaneously bidirectional. Reference in the following is to explain one direction of data transmission to explain the sequence in which nodes are visited in each embedded path. For example, in the embodiment of FIG. 4E, data is transmitted in the ring from node N0 to node N1 and to node N5, and then in an anticlockwise direction along the intralayer link in the intermediate layer. It then passes through an interlayer link to the next intermediate layer and then in a clockwise direction on the intralayer link in the next intermediate layer.

It will be apparent that symmetric bandwidth utilisation may be achieved in both symmetric and asymmetric structures—where the symmetry of a configuration is determined by the relative number of processing nodes in a layer to the number of layers in the configuration.

Figure 5A:
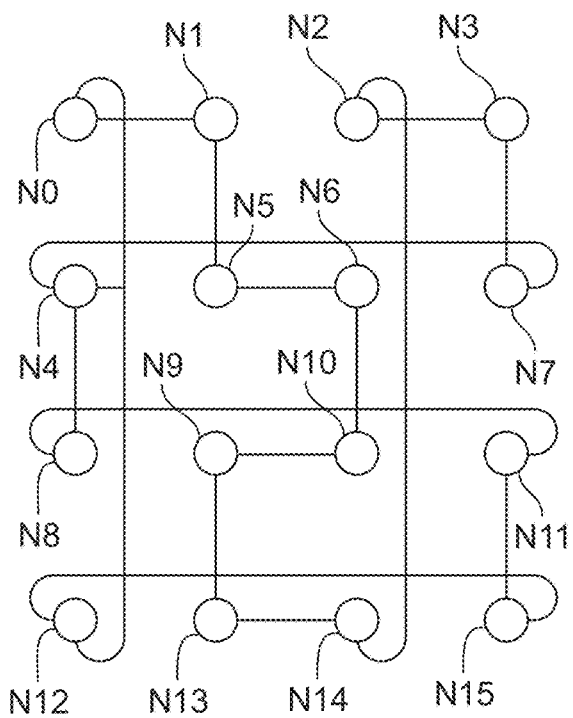
FIGS. 5A and 5B illustrate two isomorphic embedded rings which can be embedded on a 4×4 computer network connected as a toroid.
Figure 5B:
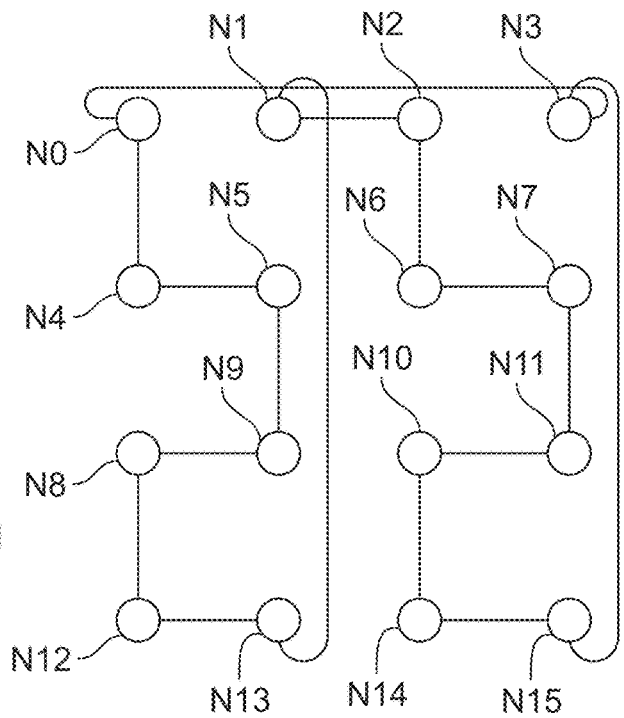

FIGS. 5A and 5B show two embedded paths in 4×4 network configuration. The node numbers in FIGS. 5A and 5B are taken from the network configuration of FIG. 4A (the top four rows). This is just by way of example. It is possible to provide a 4×4 configuration by disconnecting and reconnecting nodes in the 4×6 configuration of FIG. 4A, in which case the nodes would correspond. However, it is also possible to construct a 4×4 configuration with its own nodes. The interconnections between the nodes in FIGS. 5A and 5B show respectively the two embedded paths in the configuration.

Figure 6A:
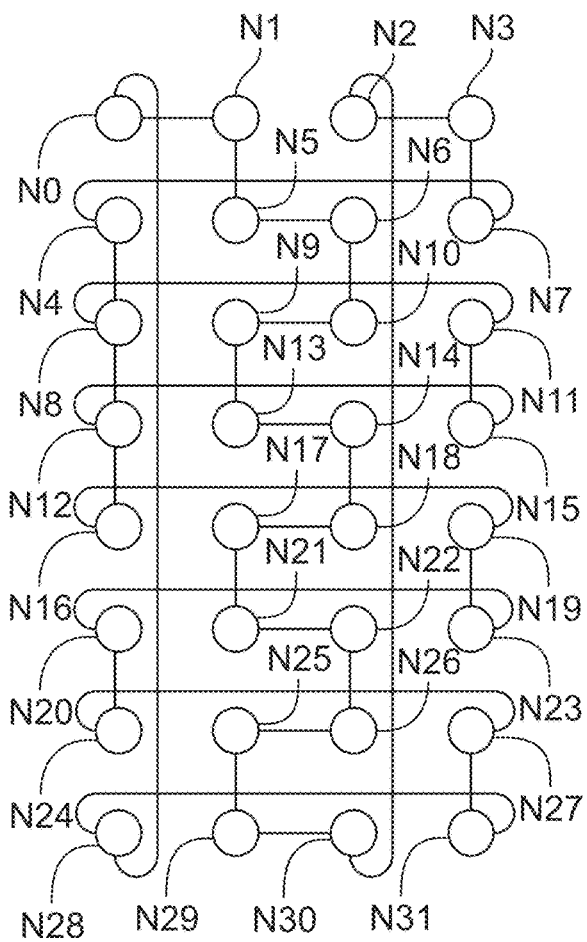
FIGS. 6A and 6B represent each of two isomorphic embedded rings on a 4×8 computer network connected as a toroid.
Figure 6B:
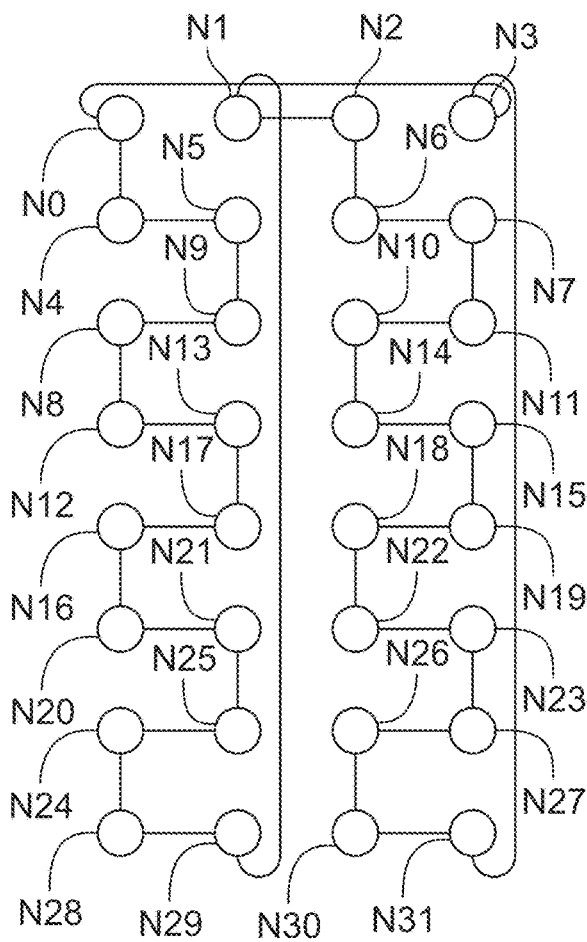

FIGS. 6A and 6B illustrate two embedded paths in a 4×8 network configuration. The node numbers are the same as those in FIG. 4A, with additional nodes N24 to N31 for the bottom two rows. As already mentioned, it would be possible to expand the 4×6 configuration of FIG. 4A to make a 4×8 configuration as shown in FIGS. 6A and 6B, but it would also be possible to construct a 4×8 configuration from its own network nodes.

The interconnections between the nodes in each of FIGS. 6A and 6B represent the respective two embedded paths in the configuration.

Figure 7A:
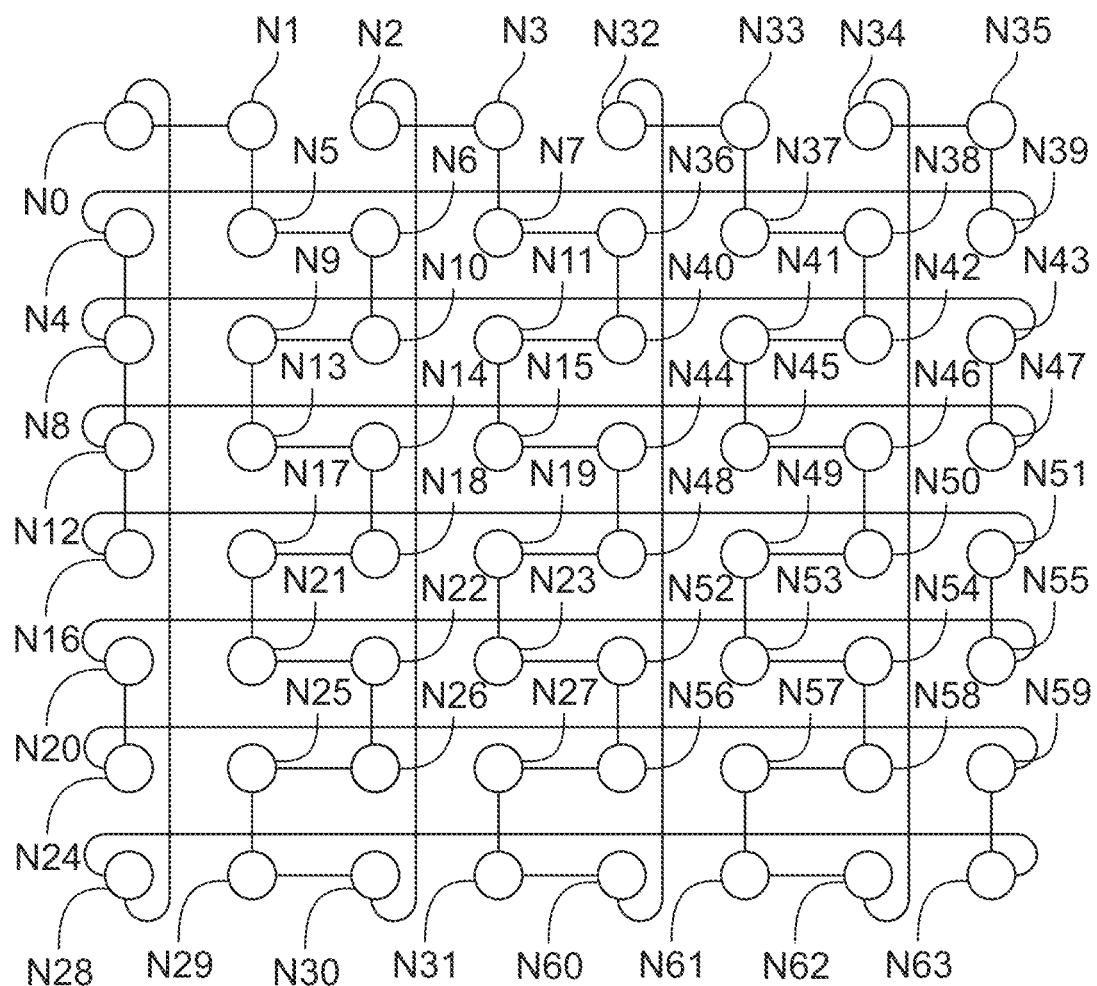
FIGS. 7A and 7B represent each of two isomorphic rings which can be embedded on a 8×8 computer network connected as a toroid.
Figure 7B:
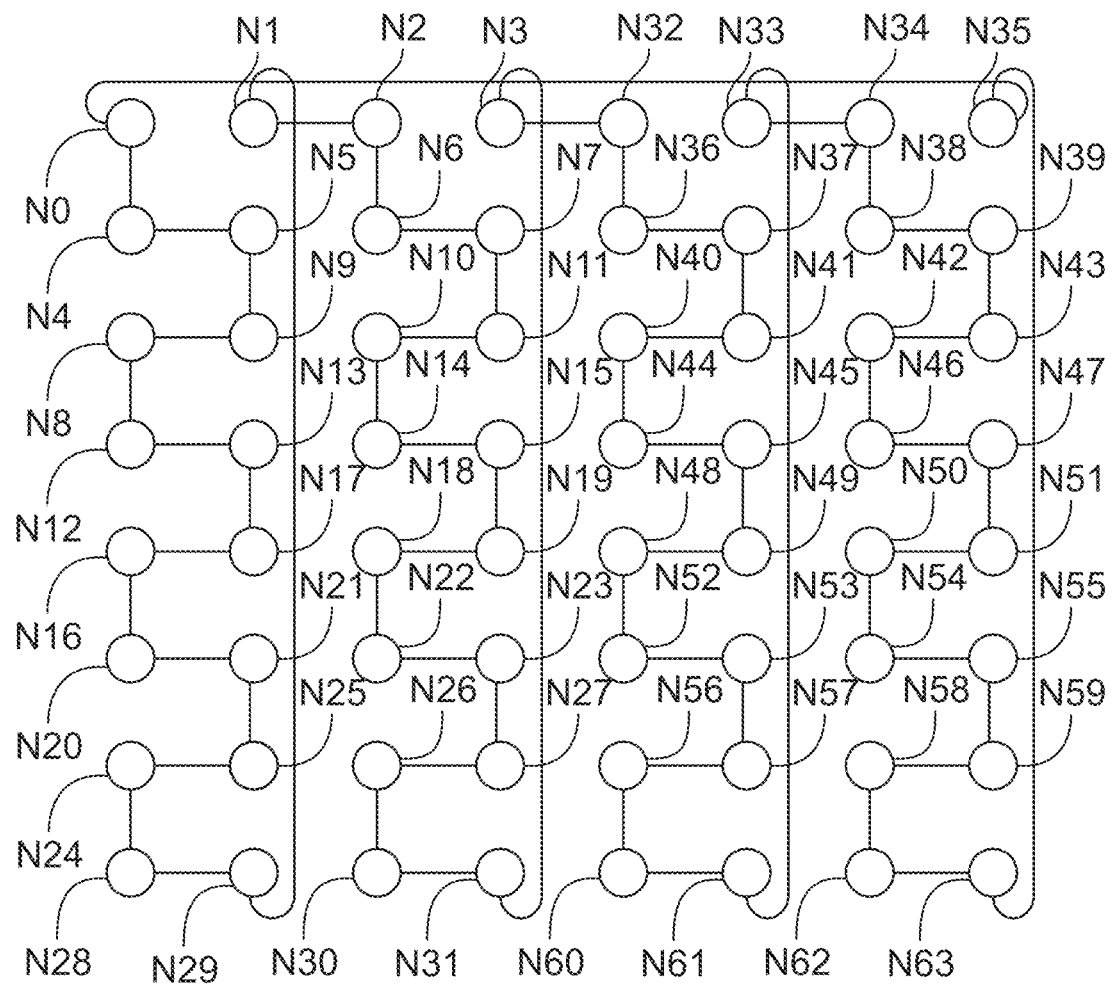

Reference is made to FIGS. 7A and 7B which illustrate two embedded paths in an 8×8 network configuration. Nodes in FIGS. 7A and 7B are labelled according to the nodes in FIG. 6A, with additional nodes N32 to N63 in the four extra columns of the configuration. It would be possible to expand the configuration of FIG. 6A by adding nodes to make the configuration shown in FIGS. 7A and 7B. Alternatively, the configuration in FIGS. 7A and 7B could be constructed from its own origin nodes.

The interconnections between the nodes in each of FIGS. 7A and 7B show respectively the two embedded rings in the network configuration.

FIG. 8A illustrates another embodiment of a computer network of twenty-four processing nodes which are arranged in a 4×6 diagonal square prism. The computer network has similarities to the toroid construction shown in FIG. 4A. However, there are some differences. The nodes are again arranged in successive layers arranged along an axis, each layer comprising four nodes connected in a ring by respective links between the processing nodes. The constructions and behaviours of the link may be as described above with reference to FIG. 4A. Corresponding processing nodes are each connected to their neighbouring node in the next layer by respective layer links. Note that in FIG. 8A the nodes are referred to as N'1, N'2 etc to distinguish them from nodes in FIG. 4A. In practice, however, the processing nodes may be the same kind of processing node as in FIG. 4A.

The construction of the network in FIG. 8A differs from that in FIG. 4A in the manner in which nodes of the endmost layers are connected. In FIG. 4A, each node of the endmost layers are connected to their corresponding node in the other endmost layer. This forms a toroid. By contrast, in FIG. 8A, diagonally opposite processing nodes in the first endmost layer are connected to each other. That is, node N'0 is connected to node N'2 and N' 1 is connected to node N'3.

Correspondingly, in the other endmost layer, node N'20 is connected to node N'22 and node N'21 is connected to node N'23.

Figure 8C:
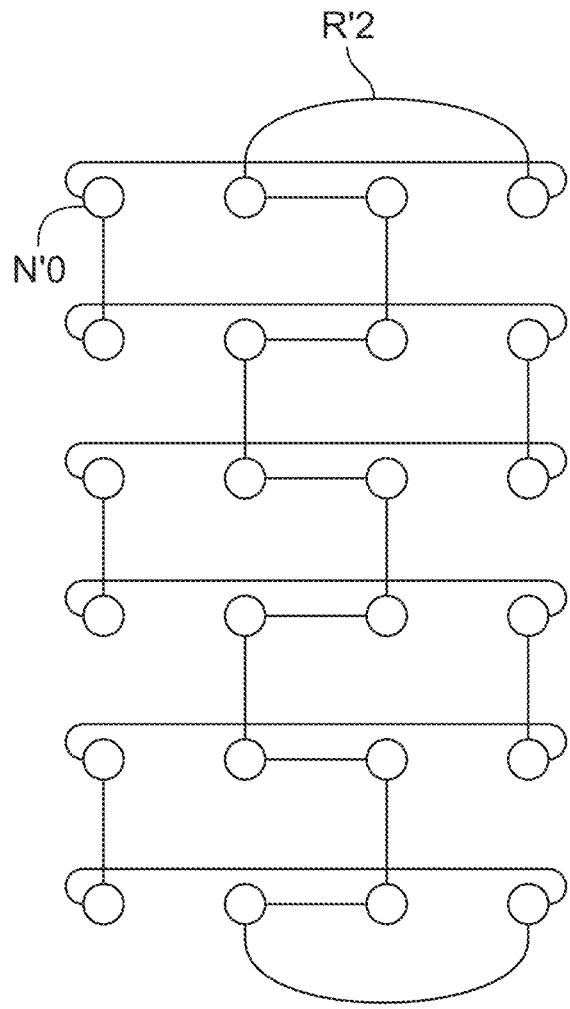

The network of FIG. 8A may be configured to embed two isomorphic rings R'1 and R'2 as shown respectively in FIGS. 8B and 8C. The ring R'1 passes through nodes N'0 to N' 1 to N'5 to N'4 to N'8 to N'9 to N'13 to N'12 to N'16 to N'17 to N'21 to N'20 to N'23 to N'19 to N'18 to N'14 to N'15 to N'11 to N'10 to N'6 to N'7 to N'3 to N'2 and back to N'0.

The ring R'2 extends from node N'1 to N'3 to N'1 to N'2 to N'6 to N'5 to N'9 to N'10 to N'14 to N'13 to N'17 to N'18 to N'22 to N'21 to N'23 to N'20 to N'16 to N'19 to N'15 to N'12 to N'8 to N'11 to N'7 to N'4 to N'0.

Once again, for the sake for the sake of clarity, note that not all nodes are labelled in FIGS. 8B and 8C.

As in the network shown in FIG. 4A, the bandwidth utilisation at each processing node is symmetric. Consider for example the processing node N'3. This has four links, each of which has a bandwidth utilisation of B/4 where B is the total node bandwidth.

Figure 8D:
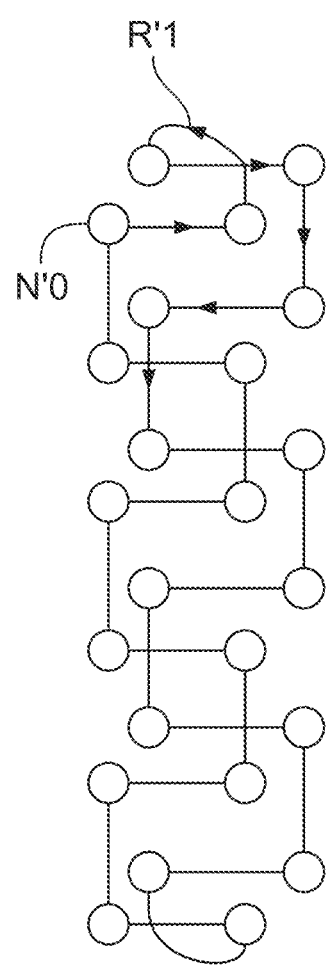
FIG. 8D is a three-dimensional diagram showing one of two embedded rings in the computer network of FIG. 8A.

FIG. 8D is a schematic three-dimensional diagram showing the ring R'1. The other ring is the same rotated 90 degrees about the y axis. Once again, arrowheads on the links denote the direction of data transmission in one direction along the ring. Data may also be transmitted in the reverse direction. In this case, data is transmitted from N'0 to node N'1, over the diagonal connecting link to node N'3 and then clockwise in the layer to nodeN'4. Data is then transmitted over an interlayer link to the next layer and anticlockwise in the intralayer link along that layer, before extending into an interlayer link to connect to the next layer. Once again therefore the path comprises successive intralayer and interlayer links. In the next layer, the data is shown transmitting in a clockwise direction. Note, however, that as with the rings of FIG. 4A, the direction in which nodes may be visited around a layer may alter. For example, it could be the same in all layers or different in different layers.

The capacity of the computer may be extended by adding additional processing nodes. These may be added in the form of additional layers in the direction of the y axis, or additional nodes in each layer in the direction of the x axis. Note here that the term x axis is used—although this refers to the 'non-axial' rings mentioned earlier. In order to do this, the interconnectivity of the processing nodes may be altered. For example, consider the addition of an extra layer added to the endmost layer at the bottom looking at FIG. 4A. The links from nodes N20, N21, N22, N23 would be disconnected and each connected to a corresponding processing node in an additional layer. These nodes are not shown in FIG. 4A, but the principles will be evident. The additional nodes will then have links connecting them back to the top endmost layer N0, N1, N2, N3. Intralayer links between the additional processing nodes connect to the extra processing nodes in a ring. Note that the connectivity of the remaining part of the configuration remains the same.

A toroid configuration may be reconnected as a diagonal closed square prism. In order to achieve this, the links which connect the endmost layers together are disconnected. Looking at FIG. 4A, link L020 is disconnected and connected instead between nodes N0 and N2. The link extending between node N23 and N3 is disconnected and node N3 is connected instead to node N1. Similarly, in the lower endmost layer, node N23 is connected to node N21 and node N22 is connected to node N20.

Thus, by reconnecting these links a diagonal closed square prism may be created from a toroid.

In some of the embodiments described herein, the computer network has a 4×n construction, where 4 represents the number of processing nodes in each layer, and n represents the number of layers. In each case, two isomorphic data transmission rings are embedded, each passing through all of the processing nodes of the network.

There is symmetric bandwidth utilisation at each processing node. That is, each link from a processing node has the same bandwidth utilisation as the other links from that processing node.

The two embedded isomorphic rings use all of the bandwidth and are such that no link is shared between the two rings. That is, each ring is enabled to have the full link bandwidth due to the lack of sharing of links.

As mentioned, in one embodiment, the computer network is hardwired into a fixed configuration. In other embodiments the links are switchable. That is, each link may be attached to a switch, or may have a switch which forms part of the link. In particular, if the links at the top and bottom layers are switchable, they can be utilised to extend the networks, or to switch between a toroid or a diagonal prism. Note that it is possible to switch between fixed hardwired structures by manually disconnecting the wires. If switches are utilised, there may be an automated change between the configurations.

A diagonal close square prism configuration has the advantage that the maximum cable length which is needed between processing nodes may be shorter than in a toroid. It can readily be seen that the cable lengths which are required to close between processing nodes in the same layer (top and bottom endmost layers in FIG. 8A are less than a "wrap-around" link which is needed to connect a node in a top endmost layer to a node in a bottom endmost layer as in the toroid configuration. Having said that it is possible to reduce cable lengths in a toroid by adopting a folded structure.

However, a toroid configuration has the advantage that the worst-case path for exchanging data between any two processing nodes is shorter than in the diagonal closed case prism case.

Note that the networks may be made fault tolerant in different ways. For example, two physical links may be provided on each link path between processing nodes.

In another example, each physical link may have multiple lanes (for example in the case of PCI Express), such that the link automatically adapts to failure on one lane of the link. The link may operate more slowly but would still operate.

Note that by embedding two rings in the structure, each of which passes through all processing nodes of the structure, in the event of a complete failure of one ring (due for example to a broken link), the other processing ring may still be in a position to operate. In the context of implementing machine learning algorithms such as Allreduce, the operation of one ring still enables a certain amount of data to be subject to the Allreduce operation. In some training contexts, this would be adequate to support ongoing operation of the algorithm until the failing ring could be repaired.

Each node is capable of implementing a processing or compute function. Each node could be implemented as a single processor. It is more likely, however, that each node will be implemented as a single chip or package of chips, wherein each chip comprises multiple processors. There are many possible different manifestations of each individual node. In one example, a node may be constituted by an intelligence processing unit of the type described in British application numbers GB 1816891.4; 1816892.2; 1717299.0; the contents of which are herein incorporated by reference. However, the techniques described herein may be used on any type of processor constituting the nodes. What is outlined herein is a method of exchanging data in an efficient manner to implement a particular exchange pattern which is useful in machine learning models. Furthermore, the links could be manifest in any suitable way. It is advantageous that they are bi-directional and preferable that they can operate in both directions at once, although this is not an essential requirement. One particular category of communication link is a SERDES link which has a power requirement which is independent of the amount of data that is carried over the link, or the time spent carrying that data. SERDES is an acronym for Serializer/DeSerializer and such links are known. In order to transmit a signal on a wire of such links, power is required to be applied to the wire to change the voltage in order to generate the signal. A SERDES link has the characteristic that power is continually applied to the wire to maintain it at a certain voltage level, such that signals may be conveyed by a variation in that voltage level (rather than by a variation between 0 and an applied voltage level). Thus, there is a fixed power for a bandwidth capacity on a SERDES link whether it is used or not. A SERDES link is implemented at each end by circuitry which connects a link layer device to a physical link such as copper wires. This circuitry is sometimes referred to as PHY (physical layer). PCIe (Peripheral Component Interconnect Express) is an interface standard for connecting high speed computers.

It is possible that the links could be dynamically deactivated to consume effectively no power while not in use. However, the activation time and non-deterministic nature of machine learning applications generally render dynamic activation during program execution as problematic. As a consequence, the present inventor has determined that it may be better to make use of the fact that the chip to chip link power consumption is essentially constant for any particular configuration, and that therefore the best optimisation is to maximise the use of the physical links by maintaining chip to chip traffic concurrent with IPU activity as far as is possible.

SERDES PHYs are full duplex (that is a 16 Gbit per second PHY supports 16 Gbits per second in each direction simultaneously), so full link bandwidth utilisation implies balanced bidirectional traffic. Moreover, note that there is significant advantage in using direct chip to chip communication as compared with indirect communication such as via switches. Direct chip to chip communication is more power efficient than switched communication.

Another factor to be taken into consideration is the bandwidth requirement between nodes. An aim is to have sufficient bandwidth to conceal inter node communication behind the computations carried out at each node for distributed machine learning.

When optimising a machine architecture for machine learning, the Allreduce collective may be used as a yardstick for the required bandwidth. An example of the Allreduce collective has been given above in the handling of parameter updating for model averaging. Other examples include gradient averaging and computing norms.

As one example, the Allreduce requirements of a residual learning network may be considered. A residual learning network is a class of deep convolutional neural network. In a deep convolutional neural network, multiple layers are utilised to learn respective features within each layer. In residual learning, residuals may be learnt instead of features. A particular residual learning network known as ResNet implements direct connections between different layers of the network. It has been demonstrated that training such residual networks may be easier in some contexts than conventional deep convolutional neural networks.

ResNet 50 is a 50-layer residual network. ResNet 50 has 25 M weights so Allreduce of all weight gradients in single position floating point format F16 involves partials of 50 megabytes. It is assumed for the sake of exemplifying the bandwidth requirement that one full Allreduce is required per full batch. This is likely to be (but does not need to be) an Allreduce of gradients. To achieve this, each node must output 100 megabits per Allreduce. ResNet 50 requires 250 gigaflops per image for training. If the sub-batch size per processing node is 16 images, each processor executes 400 gigaflops for each Allreduce collective. If a processor achieves 100 teraflops per second, it requires around 25 gigabits per second between all links to sustain concurrency of compute with Allreduce communication. With a sub-batch per processor of 8 images, the required bandwidth nominally doubles, mitigated in part by lower achievable teraflops per second to process the smaller batch.

Implementation of an Allreduce collective between p processors, each starting with a partial of size m megabytes (equal to the reduction size) requires that at least $2 m.(p-1)$ megabytes are sent over links. So the asymptotic minimum reduction time is $2 m.(p-1).(p-1)$ over $(p.1)$ if each processor has 1 links it can send over simultaneously.

The above described concepts and techniques can be utilised in several different exemplifications.

In one exemplification a fixed configuration is provided for use as a computer. In this exemplification, processing nodes are interconnected as described and illustrated in the various embodiments discussed above. In such arrangements, only essential intralayer and interlayer links are put in place between the processing nodes.

A fixed configuration may be constructed from a precise number of processing nodes for that configuration. Alternatively, it may be provided by partitioning it from a larger structure. That is, there may be provided a set of processing nodes arranged in stacked layers. The processing nodes in each stacked layer may have an interlayer link to a corresponding processing node in an adjacent stacked layer and an intralayer link between neighbouring processing nodes in the layer.

A fixed configuration of a desired number of stacked layers may be provided by disconnecting each interlayer link in a designated stacked layer of the origin set of stacked layers and connecting it to a neighbouring processing node in the designated stacked layer to provide an intralayer link. In this way, a designated stacked layer of the origin set of stacked layers may be caused to form one of the first and second endmost layers of a structure. Note that an origin set of layers may in this way be partitioned into more than one fixed configuration structure.

The interlayer and intralayer links are physical links provided by suitable buses or wires as mentioned above. In one manifestation, each processing node has a set of wires extending out of it for connecting it to another processing node. This may be done for example by one or more interface of each processing node having one or more port to which one or more physical wire is connected.

In another manifestation, the links may be constituted by on-board wires. For example, a single board may support a group of chips, for example four chips. Each chip has an interface with ports connectable to the other chips. Connections may be formed between the chips by soldering wires onto the board according to a predetermined method. Note that the concepts and techniques described herein are particularly useful in that context, because they make maximise use of links which have been pre-soldered between chips on a printed circuit board. The concepts and techniques described with reference to some embodiments may be particularly useful because they enable optimum use to be made of non-switchable links. A configuration may be built by connecting up the processing nodes as described herein using the fixed non-switchable links between the nodes. In some manifestations, there is no need to provide additional links between the processing nodes if such links will not be utilised.

In order to use the configuration, a set of parallel programs are generated. The set of parallel programs contain node level programs, that is programs designated to work on particular processing nodes in a configuration. The set of parallel programs to operate on a particular configuration may be generated by a compiler. It is the responsibility of the compiler to generate node level programs which correctly define the links to be used for each data transmission step for certain data. These programs include one or more instruction for effecting data transmission in a data transmission stage which uses a link identifier to identify the link to be used for that transmission stage. For example, a processing node may have four active links at any one time (double that if the links are simultaneously bidirectional). The link identifier causes the correct link to be selected for the data items for that transmission stage. Note that each processing node may be agnostic of the actions of its neighbouring nodes—the exchange activity is pre compiled for each exchange stage.

Note also that links do not have to be switched—there is no need for active routing of the data items at the time at which they are transmitted, or to change the connectivity of the links. However, switches may be provided in some embodiments as described.

As mentioned above, the configurations of computer networks described herein are to enhance parallelism in computing. In this context, parallelism is achieved by loading node level programs into the processing nodes of the configuration which are intended to be executed in parallel, for example to train an artificial intelligence model in a distributed manner as discussed earlier. It will be readily appreciated however that this is only one application of the parallelism enabled by the configurations described herein. One scheme for achieving parallelism is known as "bulk synchronous parallel" (BSP) computing. According to a BSP protocol, each processing node performs a compute phase and an exchange phase which follows the compute phase. During the compute phase, each processing nodes performs its computation tasks locally but does not exchange the results of its computations with the other processing nodes. In the exchange phase, each processing node is permitted to exchange the results of its computations from the preceding compute phase with the other processing nodes in the configuration. A new compute phase is not commenced until the exchange phase has been completed on the configuration. In this form of BSP protocol, a barrier synchronisation is placed at the juncture transitioning from the compute phase into the exchange phase, or transitioning from the exchange phase into the compute phase or both.

In the present embodiments, when the exchange phase is initiated, each processing node executes an instruction to exchange data with its adjacent nodes, using the link identifier established by the compiler for that exchange phase. The nature of the exchange phase can be established by using the MPI message passing standard discussed earlier. For example, a collective may be recalled from a library, such as the Allreduce collective. In this way, the compiler has precompiled node level programs which control the links over which the partial vectors are transmitted (or respective fragments of the partial vectors are transmitted).

It will readily be apparent that other synchronisation protocols may be utilised.

While particular embodiments have been described, other applications and variants of the disclosed techniques may become apparent to a person skilled in the art once given the disclosure herein. The scope of the present disclosure is not limited by the described embodiments but only by the accompanying claims.

The invention claimed is:

1. A computer comprising:
   a plurality of interconnected processing nodes arranged in a configuration in which multiple layers of interconnected nodes are arranged along an axis, each layer comprising at least four processing nodes connected in a non-axial ring by at least one respective intralayer links between each pair of neighbouring processing nodes,
   wherein each of the at least four processing nodes in each layer is connected to a respective corresponding node in one or more adjacent layer by a respective interlayer link, the computer being programmed to provide in the configuration two embedded one-dimensional paths and to transmit data around each of the two embedded one-dimensional paths, each embedded one-dimensional path using all processing nodes of the computer in such a manner that the two embedded one-dimensional paths operate simultaneously without sharing links,
   wherein the multiple layers comprise first and second endmost layers and at least one intermediate layer between the first and second endmost layers, wherein each processing node in the first endmost layer is connected to a non-neighbouring node in the first endmost layer in addition to its neighbouring node, and each processing node in the second endmost layer is connected to a non-neighbouring node in the second endmost layer in addition to its neighbouring node, and
   wherein at least one of the interlayer and intralayer links of processing nodes in the first endmost layer comprise switching circuitry operable to disconnect the processing node from its corresponding node in the second endmost layer and connect it to a non-neighbouring node in the first endmost layer.

2. The computer of claim 1, wherein the configuration is a toroid configuration in which respective connected corresponding nodes of the multiple layers form at least four axial rings.

3. The computer of claim 1 wherein at least one of the interlayer and intralayer links comprise switching circuitry operable to connect one of the processing nodes selectively to one of multiple other processing nodes.

4. The computer of claim 1, wherein each processing node is configured to output data on its respective intralayer and interlayer links with the same bandwidth utilisation on each of the intralayer and interlayer links of the processing node.

5. The computer of claim 1, wherein each layer of the multiple layers has exactly four nodes.

6. The computer of claim 1 which comprises a number of layers arranged along the axis which is greater than the number of processing nodes in each layer.

7. The computer of claim 1 which comprises a number of layers arranged along the axis which is the same as the number of nodes in each layer.

8. The computer of claim 1 wherein the intralayer and interlayer links comprise fixed connections between the processing nodes.

9. The computer of claim 1 wherein at least one of the interlayer links of processing nodes in the first endmost layer comprise switching circuitry operable to disconnect the processing node from its neighbouring node in the first endmost layer and connect it to a corresponding node in the second endmost layer.

10. The computer of claim 1 wherein each embedded one-dimensional path comprises alternating sequences of one of the interlayer links and one of the intralayer links.

11. The computer of claim 1 in which each one-dimensional embedded path comprises a sequence of processing nodes which are visited in a direction in each layer which is the same in all layers within each one-dimensional path.

12. The computer of claim 1 in which each one-dimensional embedded path comprises a sequence of processing nodes which are visited in a direction in each layer which is different in successive layers within each one-dimensional path.

13. The computer of claim 1 comprising six layers, each having four processing nodes connected in a non-axial ring.

14. The computer of claim 1 which comprises eight layers, each having eight processing nodes connected in a non-axial ring.

15. The computer of claim 1 which comprises eight layers each having four processing nodes connected in a ring.

16. The computer of claim 1 which comprises four layers, each having four processing nodes connected in a ring.

17. A computer comprising:
a plurality of interconnected processing nodes arranged in a configuration in which multiple layers of interconnected nodes are arranged along an axis, each layer comprising at least four processing nodes connected in a non-axial ring by at least one respective intralayer links between each pair of neighbouring processing nodes,
wherein each of the at least four processing nodes in each layer is connected to a respective corresponding node in one or more adjacent layer by a respective interlayer link, the computer being programmed to provide in the configuration two embedded one-dimensional paths and to transmit data around each of the two embedded one-dimensional paths, each embedded one-dimensional path using all processing nodes of the computer in such a manner that the two embedded one-dimensional paths operate simultaneously without sharing links, wherein each processing node is programmed to divide a respective partial vector of that processing node into fragments and to transmit the data in the form of successive fragments around each embedded one-dimensional path.

18. The computer of claim 17 which is programmed to operate each path as a set of logical rings, wherein the successive fragments are transmitted around each logical ring in simultaneous transmission steps.

19. The computer of claim 17, wherein each processing node is configured to output a respective fragment on each of two links simultaneously, wherein the fragment output on each of the links has approximately the same size.

20. The computer of claim 17, wherein each processing node is configured to reduce multiple incoming fragments with multiple respective corresponding locally stored fragments.

21. The computer of claim 20, wherein each processing node is configured to transmit fully reduced fragments on each of its intralayer and interlayer links simultaneously in an Allgather phase of an Allreduce collective.

22. The computer of claim 1, programmed to transmit the data in data transmission steps such that each link of a processing node is utilised with the same bandwidth as other links of that processing node in each data transmission step.

23. A method of generating a set of programs to be executed in parallel on a computer comprising a plurality of processing nodes connected in a configuration with multiple layers arranged along an axis, each layer comprising at least four processing nodes connected in a non-axial ring by a respective intralayer link between each pair of neighbouring processing nodes, wherein processing nodes in each layer are connected to respective corresponding nodes in each adjacent layer by an interlayer link, the method comprising:
generating a first data transmission instruction for a first program to define a first data transmission stage in which data is transmitted from a first node executing the first program, wherein the first data transmission instruction comprises a first link identifier which defines a first outgoing link on which data is to be transmitted from the first node in the first data transmission stage;
generating a second data transmission instruction for a second program to define a second data transmission stage in which data is transmitted from a second node executing the second program, wherein the second data transmission instruction comprises a second link identifier which defines a second outgoing link on which data is to be transmitted from the second node in the second data transmission stage; and
determining the first link identifier and the second link identifier transmit data around each of two embedded one-dimensional paths provided by the configuration, each embedded one-dimensional path using all processing nodes of the computer in such a manner that the embedded one-dimensional logical paths operate simultaneously without sharing links, and wherein the first program comprises an additional instruction to deactivate any of its interlayer and intralayer links which are not used in data transmission.

24. A method of generating a set of programs to be executed in parallel on a computer comprising a plurality of processing nodes connected in a configuration with multiple layers arranged along an axis, each layer comprising at least four processing nodes connected in a non-axial ring by a respective intralayer link between each pair of neighbouring processing nodes, wherein processing nodes in each layer are connected to respective corresponding nodes in each adjacent layer by an interlayer link, the method comprising:
generating a first data transmission instruction for a first program to define a first data transmission stage in which data is transmitted from a first node executing the first program, wherein the first data transmission instruction comprises a first link identifier which defines a first outgoing link on which data is to be transmitted from the first node in the first data transmission stage;
generating a second data transmission instruction for a second program to define a second data transmission stage in which data is transmitted from a second node executing the second program, wherein the second data transmission instruction comprises a second link identifier which defines a second outgoing link on which data is to be transmitted from the second node in the second data transmission stage; and
determining the first link identifier and the second link identifier transmit data around each of two embedded one-dimensional paths provided by the configuration, each embedded one-dimensional path using all processing nodes of the computer in such a manner that the embedded one-dimensional logical paths operate simultaneously without sharing links,
wherein the first program comprises an additional instruction to divide a respective partial vector of the first node into fragments and to transmit the data in the form of successive fragments over the first outgoing link.

25. The method of claim 23, comprising transmitting the data from the first node in data transmission steps wherein the first outgoing link is utilised with a same bandwidth as a further outgoing link of the first node in each data transmission step.

* * * * *